US010335853B2

(12) United States Patent
Tallman et al.

(10) Patent No.: US 10,335,853 B2
(45) Date of Patent: Jul. 2, 2019

(54) METHOD AND ASSEMBLY FOR FORMING COMPONENTS USING A JACKETED CORE

(71) Applicant: General Electric Company, Schenectady, NY (US)

(72) Inventors: James Albert Tallman, Glenville, NY (US); Stephen Francis Rutkowski, Duanesburg, NY (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 15/140,110

(22) Filed: Apr. 27, 2016

(65) Prior Publication Data

US 2017/0312816 A1 Nov. 2, 2017

(51) Int. Cl.
| B22D 19/00 | (2006.01) |
| B22C 9/10 | (2006.01) |
| B22C 9/24 | (2006.01) |
| B22C 7/02 | (2006.01) |
| B22C 9/04 | (2006.01) |
| B33Y 10/00 | (2015.01) |
| B33Y 80/00 | (2015.01) |

(52) U.S. Cl.
CPC .......... *B22D 19/0072* (2013.01); *B22C 7/023* (2013.01); *B22C 9/04* (2013.01); *B22C 9/046* (2013.01); *B22C 9/10* (2013.01); *B22C 9/103* (2013.01); *B22D 19/0081* (2013.01); *B33Y 10/00* (2014.12); *B33Y 80/00* (2014.12)

(58) Field of Classification Search
CPC .......... B22C 7/00; B22C 7/005; B22C 7/023; B22C 9/04; B22C 9/046; B22C 9/06; B22C 9/24; B22C 9/10; B22C 9/101; B22C 9/103; B22C 9/106; B22C 9/108; B22D 19/00; B22D 19/0072; B22D 19/0081

USPC ....... 164/19, 24, 75, 91, 132, 365, 366, 367, 164/369
See application file for complete search history.

(56) References Cited

U.S. PATENT DOCUMENTS

| 2,687,278 A | 8/1954 | Smith et al. |
| 2,756,475 A | 7/1956 | Hanink et al. |
| 2,991,520 A | 7/1961 | Dalton |

(Continued)

FOREIGN PATENT DOCUMENTS

| CH | 640440 A5 | 1/1984 |
| EP | 0025481 A1 | 3/1981 |

(Continued)

OTHER PUBLICATIONS

U.S. Non Final Office Action issued in connection with Related U.S. Appl. No. 14/972,638 dated Apr. 27, 2016.

(Continued)

*Primary Examiner* — Kevin P Kerns
(74) *Attorney, Agent, or Firm* — Armstrong Teasdale LLP

(57) ABSTRACT

A mold assembly for use in forming a component having an outer wall of a predetermined thickness is provided. The mold assembly includes a mold that includes an interior wall that defines a mold cavity within the mold. The mold assembly also includes a jacketed core positioned with respect to the mold. The jacketed core includes a jacket that includes an outer wall. The jacketed core also includes a core positioned interiorly of the jacket outer wall. The jacket separates a perimeter of the core from the mold interior wall by the predetermined thickness, such that the outer wall is formable between the perimeter and the interior wall.

28 Claims, 18 Drawing Sheets

(56) References Cited

U.S. PATENT DOCUMENTS

| | | |
|---|---|---|
| 3,222,435 A | 12/1965 | Mellen, Jr. et al. |
| 3,222,737 A | 12/1965 | Reuter |
| 3,475,375 A | 10/1969 | Yates |
| 3,563,711 A | 2/1971 | Hammond et al. |
| 3,596,703 A | 8/1971 | Bishop et al. |
| 3,597,248 A | 8/1971 | Yates |
| 3,662,816 A | 5/1972 | Bishop et al. |
| 3,678,987 A | 7/1972 | Kydd |
| 3,689,986 A | 9/1972 | Kentaro et al. |
| 3,694,264 A | 9/1972 | Weinland et al. |
| 3,773,506 A | 11/1973 | Larker et al. |
| 3,824,113 A | 7/1974 | Loxley et al. |
| 3,844,727 A | 10/1974 | Copley et al. |
| 3,863,701 A | 2/1975 | Niimi et al. |
| 3,866,448 A | 2/1975 | Dennis et al. |
| 3,921,271 A | 11/1975 | Dennis et al. |
| 3,996,048 A | 12/1976 | Fiedler |
| 4,096,296 A | 6/1978 | Galmiche et al. |
| 4,130,157 A | 12/1978 | Miller et al. |
| 4,148,352 A | 4/1979 | Sensui et al. |
| 4,236,568 A | 12/1980 | Larson |
| 4,285,634 A | 8/1981 | Rossman et al. |
| 4,352,390 A | 10/1982 | Larson |
| 4,372,404 A | 2/1983 | Drake |
| 4,375,233 A | 3/1983 | Rossmann et al. |
| 4,417,381 A | 11/1983 | Higginbotham |
| 4,432,798 A | 2/1984 | Helferich et al. |
| 4,557,691 A | 12/1985 | Martin et al. |
| 4,576,219 A | 3/1986 | Uram |
| 4,583,581 A | 4/1986 | Ferguson et al. |
| 4,604,780 A | 8/1986 | Metcalfe |
| 4,637,449 A | 1/1987 | Mills et al. |
| 4,738,587 A | 4/1988 | Kildea |
| 4,859,141 A | 8/1989 | Maisch et al. |
| 4,905,750 A | 3/1990 | Wolf |
| 4,911,990 A | 3/1990 | Prewo et al. |
| 4,964,148 A | 10/1990 | Klostermann et al. |
| 4,986,333 A | 1/1991 | Gartland |
| 5,052,463 A | 10/1991 | Lechner et al. |
| 5,083,371 A | 1/1992 | Leibfried et al. |
| 5,243,759 A | 9/1993 | Brown et al. |
| 5,248,869 A | 9/1993 | Debell et al. |
| 5,273,104 A | 12/1993 | Renaud et al. |
| 5,291,654 A | 3/1994 | Judd et al. |
| 5,295,530 A | 3/1994 | O'Connor et al. |
| 5,332,023 A | 7/1994 | Mills |
| 5,350,002 A | 9/1994 | Orton |
| 5,355,668 A | 10/1994 | Weil et al. |
| 5,371,945 A | 12/1994 | Schnoor |
| 5,387,280 A | 2/1995 | Kennerknecht |
| 5,394,932 A | 3/1995 | Carozza et al. |
| 5,398,746 A | 3/1995 | Igarashi |
| 5,413,463 A | 5/1995 | Chin et al. |
| 5,465,780 A | 11/1995 | Muntner et al. |
| 5,467,528 A | 11/1995 | Bales et al. |
| 5,468,285 A | 11/1995 | Kennerknecht |
| 5,482,054 A | 1/1996 | Slater et al. |
| 5,498,132 A | 3/1996 | Carozza et al. |
| 5,505,250 A | 4/1996 | Jago |
| 5,507,336 A | 4/1996 | Tobin |
| 5,509,659 A | 4/1996 | Igarashi |
| 5,524,695 A | 6/1996 | Schwartz |
| 5,569,320 A | 10/1996 | Sasaki et al. |
| 5,611,848 A | 3/1997 | Sasaki et al. |
| 5,664,628 A | 9/1997 | Koehler et al. |
| 5,679,270 A | 10/1997 | Thornton et al. |
| 5,738,493 A | 4/1998 | Lee et al. |
| 5,778,963 A | 7/1998 | Parille et al. |
| 5,810,552 A | 9/1998 | Frasier |
| 5,820,774 A | 10/1998 | Dietrich |
| 5,909,773 A | 6/1999 | Koehler et al. |
| 5,924,483 A | 7/1999 | Frasier |
| 5,927,373 A | 7/1999 | Tobin |
| 5,947,181 A | 9/1999 | Davis |
| 5,951,256 A | 9/1999 | Dietrich |
| 5,976,457 A | 11/1999 | Amaya et al. |
| 6,029,736 A | 2/2000 | Naik et al. |
| 6,039,763 A | 3/2000 | Shelokov |
| 6,041,679 A | 3/2000 | Slater et al. |
| 6,068,806 A | 5/2000 | Dietrich |
| 6,186,741 B1 | 2/2001 | Webb et al. |
| 6,221,289 B1 | 4/2001 | Corbett et al. |
| 6,234,753 B1 | 5/2001 | Lee |
| 6,244,327 B1 | 6/2001 | Frasier |
| 6,251,526 B1 | 6/2001 | Staub |
| 6,327,943 B1 | 12/2001 | Wrigley et al. |
| 6,359,254 B1 | 3/2002 | Brown |
| 6,441,341 B1 | 8/2002 | Steibel et al. |
| 6,467,534 B1 | 10/2002 | Klug et al. |
| 6,474,348 B1 | 11/2002 | Beggs et al. |
| 6,505,678 B2 | 1/2003 | Mertins |
| 6,557,621 B1 | 5/2003 | Dierksmeier et al. |
| 6,578,623 B2 | 6/2003 | Keller et al. |
| 6,605,293 B1 | 8/2003 | Giordano et al. |
| 6,615,470 B2 | 9/2003 | Corderman et al. |
| 6,623,521 B2 | 9/2003 | Steinke et al. |
| 6,626,230 B1 | 9/2003 | Woodrum et al. |
| 6,634,858 B2 | 10/2003 | Roeloffs et al. |
| 6,637,500 B2 | 10/2003 | Shah et al. |
| 6,644,921 B2 | 11/2003 | Bunker et al. |
| 6,670,026 B2 | 12/2003 | Steibel et al. |
| 6,694,731 B2 | 2/2004 | Kamen et al. |
| 6,773,231 B2 | 8/2004 | Bunker et al. |
| 6,799,627 B2 | 10/2004 | Ray et al. |
| 6,800,234 B2 | 10/2004 | Ferguson et al. |
| 6,817,379 B2 | 11/2004 | Perla |
| 6,837,417 B2 | 1/2005 | Srinivasan |
| 6,896,036 B2 | 5/2005 | Schneiders et al. |
| 6,913,064 B2 | 7/2005 | Beals et al. |
| 6,929,054 B2 | 8/2005 | Beals et al. |
| 6,955,522 B2 | 10/2005 | Cunha et al. |
| 6,986,381 B2 | 1/2006 | Ray et al. |
| 7,028,747 B2 | 4/2006 | Widrig et al. |
| 7,036,556 B2 | 5/2006 | Caputo et al. |
| 7,052,710 B2 | 5/2006 | Giordano et al. |
| 7,073,561 B1 | 7/2006 | Henn |
| 7,093,645 B2 | 8/2006 | Grunstra et al. |
| 7,108,045 B2 | 9/2006 | Wiedemer et al. |
| 7,109,822 B2 | 9/2006 | Perkins et al. |
| 7,174,945 B2 | 2/2007 | Beals et al. |
| 7,185,695 B1 | 3/2007 | Santeler |
| 7,207,375 B2 | 4/2007 | Turkington et al. |
| 7,234,506 B2 | 6/2007 | Grunstra et al. |
| 7,237,375 B2 | 7/2007 | Humcke et al. |
| 7,237,595 B2 | 7/2007 | Beck et al. |
| 7,240,718 B2 | 7/2007 | Schmidt et al. |
| 7,243,700 B2 | 7/2007 | Beals et al. |
| 7,246,652 B2 | 7/2007 | Fowler |
| 7,270,170 B2 | 9/2007 | Beals et al. |
| 7,270,173 B2 | 9/2007 | Wiedemer et al. |
| 7,278,460 B2 | 10/2007 | Grunstra et al. |
| 7,278,463 B2 | 10/2007 | Snyder et al. |
| 7,306,026 B2 | 12/2007 | Memmen |
| 7,322,795 B2 | 1/2008 | Luczak et al. |
| 7,325,587 B2 | 2/2008 | Memmen |
| 7,334,625 B2 | 2/2008 | Judge et al. |
| 7,343,730 B2 | 3/2008 | Humcke et al. |
| 7,371,043 B2 | 5/2008 | Keller |
| 7,371,049 B2 | 5/2008 | Cunha et al. |
| 7,377,746 B2 | 5/2008 | Brassfield et al. |
| 7,410,342 B2 | 8/2008 | Matheny |
| 7,438,118 B2 | 10/2008 | Santeler |
| 7,448,433 B2 | 11/2008 | Ortiz et al. |
| 7,448,434 B2 | 11/2008 | Turkington et al. |
| 7,461,684 B2 | 12/2008 | Liu et al. |
| 7,478,994 B2 | 1/2009 | Cunha et al. |
| 7,517,225 B2 | 4/2009 | Cherian |
| 7,575,039 B2 | 8/2009 | Beals et al. |
| 7,588,069 B2 | 9/2009 | Munz et al. |
| 7,624,787 B2 | 12/2009 | Lee et al. |
| 7,625,172 B2 | 12/2009 | Walz et al. |
| 7,673,669 B2 | 3/2010 | Snyder et al. |
| 7,686,065 B2 | 3/2010 | Luczak |
| 7,713,029 B1 | 5/2010 | Davies |

(56) References Cited

U.S. PATENT DOCUMENTS

| | | |
|---|---|---|
| 7,717,676 B2 | 5/2010 | Cunha et al. |
| 7,722,327 B1 | 5/2010 | Liang |
| 7,802,613 B2 | 5/2010 | Bullied et al. |
| 7,727,495 B2 | 6/2010 | Burd et al. |
| 7,731,481 B2 | 6/2010 | Cunha et al. |
| 7,753,104 B2 | 7/2010 | Luczak et al. |
| 7,757,745 B2 | 7/2010 | Luczak |
| 7,771,210 B2 | 8/2010 | Cherian |
| 7,779,892 B2 | 8/2010 | Luczak et al. |
| 7,789,626 B1 | 9/2010 | Liang |
| 7,798,201 B2 | 9/2010 | Bewlay et al. |
| 7,806,681 B2 | 10/2010 | Feick et al. |
| 7,861,766 B2 | 1/2011 | Bochiechio et al. |
| 7,882,884 B2 | 2/2011 | Beals et al. |
| 7,938,168 B2 | 5/2011 | Lee et al. |
| 7,947,233 B2 | 5/2011 | Burd et al. |
| 7,963,085 B2 | 6/2011 | Sypeck et al. |
| 7,993,106 B2 | 8/2011 | Walters |
| 8,057,183 B1 | 11/2011 | Liang |
| 8,066,483 B1 | 11/2011 | Liang |
| 8,100,165 B2 | 1/2012 | Piggush et al. |
| 8,113,780 B2 | 2/2012 | Cherolis et al. |
| 8,122,583 B2 | 2/2012 | Luczak et al. |
| 8,137,068 B2 | 3/2012 | Surace et al. |
| 8,162,609 B1 | 4/2012 | Liang |
| 8,167,537 B1 | 5/2012 | Plank et al. |
| 8,171,978 B2 | 5/2012 | Propheter-Hinckley et al. |
| 8,181,692 B2 | 5/2012 | Frasier et al. |
| 8,196,640 B1 | 6/2012 | Paulus et al. |
| 8,251,123 B2 | 8/2012 | Farris et al. |
| 8,251,660 B1 | 8/2012 | Liang |
| 8,261,810 B1 | 9/2012 | Liang |
| 8,291,963 B1 | 10/2012 | Trinks et al. |
| 8,297,455 B2 | 10/2012 | Smyth |
| 8,302,668 B1 | 11/2012 | Bullied et al. |
| 8,303,253 B1 | 11/2012 | Liang |
| 8,307,654 B1 | 11/2012 | Liang |
| 8,317,475 B1 | 11/2012 | Downs |
| 8,322,988 B1 | 12/2012 | Downs et al. |
| 8,336,606 B2 | 12/2012 | Piggush |
| 8,342,802 B1 | 1/2013 | Liang |
| 8,366,394 B1 | 2/2013 | Liang |
| 8,381,923 B2 | 2/2013 | Smyth |
| 8,414,263 B1 | 4/2013 | Liang |
| 8,500,401 B1 | 8/2013 | Liang |
| 8,506,256 B1 | 8/2013 | Brostmeyer et al. |
| 8,535,004 B2 | 9/2013 | Campbell |
| 8,622,113 B1 | 1/2014 | Rau, III |
| 8,678,766 B1 | 3/2014 | Liang |
| 8,734,108 B1 | 5/2014 | Liang |
| 8,753,083 B2 | 6/2014 | Lacy et al. |
| 8,770,931 B2 | 7/2014 | Alvanos et al. |
| 8,777,571 B1 | 7/2014 | Liang |
| 8,793,871 B2 | 8/2014 | Morrison et al. |
| 8,794,298 B2 | 8/2014 | Schlienger et al. |
| 8,807,943 B1 | 8/2014 | Liang |
| 8,813,812 B2 | 8/2014 | Ellgass et al. |
| 8,813,824 B2 | 8/2014 | Appleby et al. |
| 8,858,176 B1 | 10/2014 | Liang |
| 8,864,469 B1 | 10/2014 | Liang |
| 8,870,524 B1 | 10/2014 | Liang |
| 8,876,475 B1 | 11/2014 | Liang |
| 8,893,767 B2 | 11/2014 | Mueller et al. |
| 8,899,303 B2 | 12/2014 | Mueller et al. |
| 8,906,170 B2 | 12/2014 | Gigliotti, Jr. et al. |
| 8,911,208 B2 | 12/2014 | Propheter-Hinckley et al. |
| 8,915,289 B2 | 12/2014 | Mueller et al. |
| 8,936,068 B2 | 1/2015 | Lee et al. |
| 8,940,114 B2 | 1/2015 | James et al. |
| 8,969,760 B2 | 3/2015 | Hu et al. |
| 8,978,385 B2 | 3/2015 | Cunha |
| 8,993,923 B2 | 3/2015 | Hu et al. |
| 8,997,836 B2 | 4/2015 | Mueller et al. |
| 9,038,706 B2 | 5/2015 | Hillier |
| 9,051,838 B2 | 6/2015 | Wardle et al. |
| 9,057,277 B2 | 6/2015 | Appleby et al. |
| 9,057,523 B2 | 6/2015 | Cunha et al. |
| 9,061,350 B2 | 6/2015 | Bewlay et al. |
| 9,079,241 B2 | 7/2015 | Barber et al. |
| 9,079,803 B2 | 7/2015 | Xu |
| 9,174,271 B2 | 11/2015 | Newton et al. |
| 2001/0044651 A1 | 11/2001 | Steinke et al. |
| 2002/0029567 A1 | 3/2002 | Kamen et al. |
| 2002/0182056 A1 | 12/2002 | Widrig et al. |
| 2002/0187065 A1 | 12/2002 | Amaya et al. |
| 2002/0190039 A1 | 12/2002 | Steibel et al. |
| 2002/0197161 A1 | 12/2002 | Roeloffs et al. |
| 2003/0047197 A1 | 3/2003 | Beggs et al. |
| 2003/0062088 A1 | 4/2003 | Perla |
| 2003/0133799 A1 | 7/2003 | Widrig et al. |
| 2003/0150092 A1 | 8/2003 | Corderman et al. |
| 2003/0199969 A1 | 10/2003 | Steinke et al. |
| 2003/0201087 A1 | 10/2003 | Devine et al. |
| 2004/0024470 A1 | 2/2004 | Giordano et al. |
| 2004/0055725 A1 | 3/2004 | Ray et al. |
| 2004/0056079 A1 | 3/2004 | Srinivasan |
| 2004/0144089 A1 | 7/2004 | Kamen et al. |
| 2004/0154252 A1 | 8/2004 | Sypeck et al. |
| 2004/0159985 A1 | 8/2004 | Altoonian et al. |
| 2005/0006047 A1 | 1/2005 | Wang et al. |
| 2005/0016706 A1 | 1/2005 | Ray et al. |
| 2005/0087319 A1 | 4/2005 | Beals et al. |
| 2005/0133193 A1 | 6/2005 | Beals et al. |
| 2005/0247429 A1 | 11/2005 | Turkington et al. |
| 2006/0032604 A1 | 2/2006 | Beck et al. |
| 2006/0048553 A1 | 3/2006 | Almquist |
| 2006/0065383 A1 | 3/2006 | Ortiz et al. |
| 2006/0107668 A1 | 5/2006 | Cunha et al. |
| 2006/0118262 A1 | 6/2006 | Beals et al. |
| 2006/0118990 A1 | 6/2006 | Dierkes et al. |
| 2006/0237163 A1 | 10/2006 | Turkington et al. |
| 2006/0283168 A1 | 12/2006 | Humcke et al. |
| 2007/0044936 A1 | 3/2007 | Memmen |
| 2007/0059171 A1 | 3/2007 | Simms et al. |
| 2007/0107412 A1 | 5/2007 | Humcke et al. |
| 2007/0114001 A1 | 5/2007 | Snyder et al. |
| 2007/0116972 A1 | 5/2007 | Persky |
| 2007/0169605 A1 | 7/2007 | Szymanski |
| 2007/0177975 A1 | 8/2007 | Luczak et al. |
| 2007/0253816 A1 | 11/2007 | Walz et al. |
| 2008/0003849 A1 | 1/2008 | Cherian |
| 2008/0080979 A1 | 4/2008 | Brassfield et al. |
| 2008/0131285 A1 | 6/2008 | Albert et al. |
| 2008/0135718 A1 | 6/2008 | Lee et al. |
| 2008/0138208 A1 | 6/2008 | Walters |
| 2008/0138209 A1 | 6/2008 | Cunha et al. |
| 2008/0145235 A1 | 6/2008 | Cunha et al. |
| 2008/0169412 A1 | 7/2008 | Snyder et al. |
| 2008/0190582 A1 | 8/2008 | Lee et al. |
| 2009/0041587 A1 | 2/2009 | Konter et al. |
| 2009/0095435 A1 | 4/2009 | Luczak et al. |
| 2009/0181560 A1 | 7/2009 | Cherian |
| 2009/0255742 A1 | 10/2009 | Hansen |
| 2010/0021643 A1 | 1/2010 | Lane et al. |
| 2010/0150733 A1 | 6/2010 | Abdel-Messeh et al. |
| 2010/0200189 A1 | 8/2010 | Qi et al. |
| 2010/0219325 A1 | 9/2010 | Bullied et al. |
| 2010/0276103 A1 | 11/2010 | Bullied et al. |
| 2010/0304064 A1 | 12/2010 | Huttner |
| 2011/0048665 A1 | 3/2011 | Schlienger et al. |
| 2011/0068077 A1 | 3/2011 | Smyth |
| 2011/0132563 A1 | 6/2011 | Merrill et al. |
| 2011/0132564 A1 | 6/2011 | Merrill et al. |
| 2011/0135446 A1 | 6/2011 | Dube et al. |
| 2011/0146075 A1 | 6/2011 | Hazel et al. |
| 2011/0150666 A1 | 6/2011 | Hazel et al. |
| 2011/0189440 A1 | 8/2011 | Appleby et al. |
| 2011/0236221 A1 | 9/2011 | Campbell |
| 2011/0240245 A1 | 10/2011 | Schlienger et al. |
| 2011/0250078 A1 | 10/2011 | Bruce et al. |
| 2011/0250385 A1 | 10/2011 | Sypeck et al. |
| 2011/0293434 A1 | 12/2011 | Lee et al. |
| 2011/0315337 A1 | 12/2011 | Piggush |
| 2012/0161498 A1 | 6/2012 | Hansen |

(56) References Cited

U.S. PATENT DOCUMENTS

| | | |
|---|---|---|
| 2012/0163995 A1 | 6/2012 | Wardle et al. |
| 2012/0168108 A1 | 7/2012 | Farris et al. |
| 2012/0186681 A1 | 7/2012 | Sun et al. |
| 2012/0186768 A1 | 7/2012 | Sun et al. |
| 2012/0193841 A1 | 8/2012 | Wang et al. |
| 2012/0237786 A1 | 9/2012 | Morrison et al. |
| 2012/0276361 A1 | 11/2012 | James et al. |
| 2012/0298321 A1 | 11/2012 | Smyth |
| 2013/0019604 A1 | 1/2013 | Cunha et al. |
| 2013/0025287 A1 | 1/2013 | Cunha |
| 2013/0025288 A1 | 1/2013 | Cunha et al. |
| 2013/0064676 A1 | 3/2013 | Salisbury et al. |
| 2013/0139990 A1 | 6/2013 | Appleby et al. |
| 2013/0177448 A1 | 7/2013 | Spangler |
| 2013/0220571 A1 | 8/2013 | Mueller et al. |
| 2013/0266816 A1 | 10/2013 | Xu |
| 2013/0280093 A1 | 10/2013 | Zelesky et al. |
| 2013/0318771 A1 | 12/2013 | Luczak et al. |
| 2013/0323033 A1 | 12/2013 | Lutjen et al. |
| 2013/0327602 A1 | 12/2013 | Barber et al. |
| 2013/0333855 A1 | 12/2013 | Merrill et al. |
| 2013/0338267 A1 | 12/2013 | Appleby et al. |
| 2014/0023497 A1 | 1/2014 | Giglio et al. |
| 2014/0031458 A1 | 1/2014 | Jansen |
| 2014/0033736 A1 | 2/2014 | Propheter-Hinckley et al. |
| 2014/0068939 A1 | 3/2014 | Devine, II et al. |
| 2014/0076857 A1 | 3/2014 | Hu et al. |
| 2014/0076868 A1 | 3/2014 | Hu et al. |
| 2014/0093387 A1 | 4/2014 | Pointon et al. |
| 2014/0140860 A1 | 5/2014 | Tibbott et al. |
| 2014/0169981 A1 | 6/2014 | Bales et al. |
| 2014/0199177 A1 | 7/2014 | Propheter-Hinckley et al. |
| 2014/0202650 A1 | 7/2014 | Song et al. |
| 2014/0284016 A1 | 9/2014 | Vander Wal |
| 2014/0311315 A1 | 10/2014 | Isaac |
| 2014/0314581 A1 | 10/2014 | McBrien et al. |
| 2014/0342175 A1 | 11/2014 | Morrison et al. |
| 2014/0342176 A1 | 11/2014 | Appleby et al. |
| 2014/0356560 A1 | 12/2014 | Prete et al. |
| 2014/0363305 A1 | 12/2014 | Shah et al. |
| 2015/0053365 A1 | 2/2015 | Mueller et al. |
| 2015/0174653 A1 | 6/2015 | Verner et al. |
| 2015/0184857 A1 | 7/2015 | Cunha et al. |

FOREIGN PATENT DOCUMENTS

| | | |
|---|---|---|
| EP | 0025481 B1 | 2/1983 |
| EP | 0111600 A1 | 6/1984 |
| EP | 0190114 A1 | 8/1986 |
| EP | 0319244 A2 | 6/1989 |
| EP | 0324229 A2 | 7/1989 |
| EP | 0324229 B1 | 7/1992 |
| EP | 0539317 A1 | 4/1993 |
| EP | 0556946 A1 | 8/1993 |
| EP | 0559251 A1 | 9/1993 |
| EP | 0585183 A1 | 3/1994 |
| EP | 0319244 B1 | 5/1994 |
| EP | 0661246 A1 | 7/1995 |
| EP | 0539317 B1 | 11/1995 |
| EP | 0715913 A1 | 6/1996 |
| EP | 0725606 A1 | 8/1996 |
| EP | 0750956 A2 | 1/1997 |
| EP | 0750957 A1 | 1/1997 |
| EP | 0792409 A1 | 9/1997 |
| EP | 0691894 B1 | 10/1997 |
| EP | 0805729 A2 | 11/1997 |
| EP | 0818256 A1 | 1/1998 |
| EP | 0556946 B1 | 4/1998 |
| EP | 0559251 B1 | 12/1998 |
| EP | 0585183 B1 | 3/1999 |
| EP | 0899039 A2 | 3/1999 |
| EP | 0750956 B1 | 5/1999 |
| EP | 0661246 B1 | 9/1999 |
| EP | 0725606 B1 | 12/1999 |
| EP | 0968062 A1 | 1/2000 |
| EP | 0805729 B1 | 8/2000 |
| EP | 1055800 A2 | 11/2000 |
| EP | 1070829 A2 | 1/2001 |
| EP | 1124509 A1 | 8/2001 |
| EP | 1142658 A1 | 10/2001 |
| EP | 1161307 A1 | 12/2001 |
| EP | 1163970 A1 | 12/2001 |
| EP | 1178769 A1 | 2/2002 |
| EP | 0715913 B1 | 4/2002 |
| EP | 0968062 B1 | 5/2002 |
| EP | 0951579 B1 | 1/2003 |
| EP | 1284338 A2 | 2/2003 |
| EP | 0750957 B1 | 3/2003 |
| EP | 1341481 A2 | 9/2003 |
| EP | 1358958 A1 | 11/2003 |
| EP | 1367224 A1 | 12/2003 |
| EP | 0818256 B1 | 2/2004 |
| EP | 1124509 B1 | 3/2004 |
| EP | 1425483 A2 | 6/2004 |
| EP | 1055800 B1 | 10/2004 |
| EP | 1163970 B1 | 3/2005 |
| EP | 1358958 B1 | 3/2005 |
| EP | 1519116 A1 | 3/2005 |
| EP | 1531019 A1 | 5/2005 |
| EP | 0899039 B1 | 11/2005 |
| EP | 1604753 A1 | 12/2005 |
| EP | 1659264 A2 | 5/2006 |
| EP | 1178769 B1 | 7/2006 |
| EP | 1382403 B1 | 9/2006 |
| EP | 1759788 A2 | 3/2007 |
| EP | 1764171 A1 | 3/2007 |
| EP | 1813775 A2 | 8/2007 |
| EP | 1815923 A1 | 8/2007 |
| EP | 1849965 A2 | 10/2007 |
| EP | 1070829 B1 | 1/2008 |
| EP | 1142658 B1 | 3/2008 |
| EP | 1927414 A2 | 6/2008 |
| EP | 1930097 A1 | 6/2008 |
| EP | 1930098 A1 | 6/2008 |
| EP | 1930099 A1 | 6/2008 |
| EP | 1932604 A1 | 6/2008 |
| EP | 1936118 A2 | 6/2008 |
| EP | 1939400 A2 | 7/2008 |
| EP | 1984162 A1 | 10/2008 |
| EP | 1604753 B1 | 11/2008 |
| EP | 2000234 A2 | 12/2008 |
| EP | 2025869 A1 | 2/2009 |
| EP | 1531019 B1 | 3/2010 |
| EP | 2212040 A1 | 8/2010 |
| EP | 2246133 A1 | 11/2010 |
| EP | 2025869 B1 | 12/2010 |
| EP | 2335845 A1 | 6/2011 |
| EP | 2336493 A2 | 6/2011 |
| EP | 2336494 A2 | 6/2011 |
| EP | 1930097 B1 | 7/2011 |
| EP | 2362822 A2 | 9/2011 |
| EP | 2366476 A1 | 9/2011 |
| EP | 2392774 A1 | 12/2011 |
| EP | 1930098 B1 | 2/2012 |
| EP | 2445668 A2 | 5/2012 |
| EP | 2445669 A2 | 5/2012 |
| EP | 2461922 A1 | 6/2012 |
| EP | 1659264 B1 | 11/2012 |
| EP | 2519367 A2 | 11/2012 |
| EP | 2537606 A1 | 12/2012 |
| EP | 1927414 B1 | 1/2013 |
| EP | 2549186 A1 | 1/2013 |
| EP | 2551592 A2 | 1/2013 |
| EP | 2551593 A2 | 1/2013 |
| EP | 2559533 A2 | 2/2013 |
| EP | 2559534 A2 | 2/2013 |
| EP | 2559535 A2 | 2/2013 |
| EP | 2576099 A1 | 4/2013 |
| EP | 2000234 B1 | 7/2013 |
| EP | 2614902 A2 | 7/2013 |
| EP | 2650062 A2 | 10/2013 |
| EP | 2246133 B1 | 7/2014 |
| EP | 2366476 B1 | 7/2014 |
| EP | 2777841 A1 | 9/2014 |

(56) References Cited

FOREIGN PATENT DOCUMENTS

| | | | |
|---|---|---|---|
| EP | 1849965 | B1 | 2/2015 |
| EP | 2834031 | A2 | 2/2015 |
| EP | 1341481 | B1 | 3/2015 |
| EP | 2841710 | A1 | 3/2015 |
| EP | 2855857 | A2 | 4/2015 |
| EP | 2880276 | A1 | 6/2015 |
| EP | 2937161 | A1 | 10/2015 |
| GB | 731292 | A | 6/1955 |
| GB | 800228 | A | 8/1958 |
| GB | 2102317 | A | 2/1983 |
| GB | 2118078 | A | 10/1983 |
| JP | H1052731 | A | 2/1998 |
| WO | 9615866 | A1 | 5/1996 |
| WO | 9618022 | A1 | 6/1996 |
| WO | 2010036801 | A2 | 4/2010 |
| WO | 2010040746 | A1 | 4/2010 |
| WO | 2010151833 | A2 | 12/2010 |
| WO | 2010151838 | A2 | 12/2010 |
| WO | 2011019667 | A1 | 2/2011 |
| WO | 2013163020 | A1 | 10/2013 |
| WO | 2014011262 | A2 | 1/2014 |
| WO | 2014022255 | A1 | 2/2014 |
| WO | 2014028095 | A2 | 2/2014 |
| WO | 2014093826 | A2 | 6/2014 |
| WO | 2014105108 | A1 | 7/2014 |
| WO | 2014109819 | A1 | 7/2014 |
| WO | 2014133635 | A2 | 9/2014 |
| WO | 2014179381 | A1 | 11/2014 |
| WO | 2015006026 | A1 | 1/2015 |
| WO | 2015006440 | A1 | 1/2015 |
| WO | 2015006479 | A1 | 1/2015 |
| WO | 2015009448 | A1 | 1/2015 |
| WO | 2015042089 | A1 | 3/2015 |
| WO | 2015050987 | A1 | 4/2015 |
| WO | 2015053833 | A1 | 4/2015 |
| WO | 2015073068 | A1 | 5/2015 |
| WO | 2015073657 | A1 | 5/2015 |
| WO | 2015080854 | A1 | 6/2015 |
| WO | 2015094636 | A1 | 6/2015 |

OTHER PUBLICATIONS

U.S. Final Office Action issued in connection with Related U.S. Appl. No. 14/972,638 dated Jul. 20, 2016.
U.S. Non Final Office Action issued in connection with Related U.S. Appl. No. 14/972,638 dated Nov. 23, 2016.
U.S. Final Office Action issued in connection with Related U.S. Appl. No. 14/972,638 dated Apr. 12, 2017.
European Search Report and Opinion issued in connection with related EP Application No. 16202422.8 dated May 8, 2017.
European Search Report and Opinion issued in connection with related EP Application No. 16204602.3 dated May 12, 2017.
European Search Report and Opinion issued in connection with related EP Application No. 16204609.8 dated May 12, 2017.
European Search Report and Opinion issued in connection with related EP Application No. 16204610.6 dated May 17, 2017.
European Search Report and Opinion issued in connection with corresponding EP Application No. 16204613.0 dated May 22, 2017.
European Search Report and Opinion issued in connection with related EP Application No. 16204605.6 dated May 26, 2017.
European Search Report and Opinion issued in connection with related EP Application No. 16204607.2 dated May 26, 2017.
European Search Report and Opinion issued in connection with related EP Application No. 16204608.0 dated May 26, 2017.
European Search Report and Opinion issued in connection with related EP Application No. 16204617.1 dated May 26, 2017.
European Search Report and Opinion issued in connection with related EP Application No. 16204614.8.0 dated Jun. 2, 2017.
European Search Report and Opinion issued in connection with related EP Application No. 16204613.0 dated Jun. 2, 2017.
European Search Report and Opinion issued in connection with corresponding EP Application No. 17168418.6 dated Aug. 10, 2017.
Ziegelheim, J. et al., "Diffusion bondability of similar/dissimilar light metal sheets," Journal of Materials Processing Technology 186.1 (May 2007): 87-93.
Liu et al, "Effect of nickel coating on bending properties of stereolithography photo-polymer SL5195", Materials & Design, vol. 26, Issue 6, pp. 493-496, 2005.
U.S. Appl. No. 14/972,413, filed Dec. 17, 2015, entitled Method and Assembly for Forming Components Having Internal Passages Using a Jacketed Core.
U.S. Appl. No. 14/972,645, filed Dec. 17, 2015, entitled Mold Assembly Including a Deoxygenated Core and Method of Making Same.
U.S. Appl. No. 14/973,595, filed Dec. 17, 2015, entitled Method and Assembly for Forming Components Having Internal Passages Using a Lattice Structure.
U.S. Appl. No. 14/972,805, filed Dec. 17, 2015, entitled Method and Assembly for Forming Components Having Internal Passages Using a Jacketed Core.
U.S. Appl. No. 14/972,390, filed Dec. 17, 2015, entitled Method and Assembly for Forming Components Having an Internal Passage Defined Therein.
U.S. Appl. No. 14/972,440, filed Dec. 17, 2015, entitled Method and Assembly for Forming Components Having an Internal Passage Defined Therein.
U.S. Appl. No. 14/973,590, filed Dec. 17, 2015, entitled Method and Assembly for Forming Components Having a Catalyzed Internal Passage Defined Therein.
U.S. Appl. No. 14/973,555, filed Dec. 17, 2015, entitled Method and Assembly for Forming Components Having an Internal Passage Defined Therein.
U.S. Appl. No. 14/973,250, filed Dec. 17, 2015, entitled Method and Assembly for Forming Components Having Internal Passages Using a Jacketed Core.
U.S. Appl. No. 14/973,501, filed Dec. 17, 2015, entitled Method and Assembly for Forming Components Having Internal Passages Using a Lattice Structure.
U.S. Appl. No. 14/972,638, filed Dec. 17, 2015, entitled Method and Assembly for Forming Components Having Internal Passages Using a Jacketed Core.
U.S. Appl. No. 14/973,039, filed Dec. 17, 2015, entitled Method and Assembly for Forming Components Having Internal Passages Using a Lattice Structure.

METHOD AND ASSEMBLY FOR FORMING COMPONENTS USING A JACKETED CORE

BACKGROUND

The field of the disclosure relates generally to components having an outer wall of a preselected thickness, and more particularly to forming such components using a jacketed core.

Some components require an outer wall to be formed with a preselected thickness, for example, in order to perform an intended function. For example, but not by way of limitation, some components, such as hot gas path components of gas turbines, are subjected to high temperatures. At least some such components have internal voids defined therein, such as but not limited to a network of plenums and passages, to receive a flow of a cooling fluid adjacent the outer wall, and an efficacy of the cooling provided is related to the thickness of the outer wall.

At least some known components having a preselected outer wall thickness are formed in a mold, with a core of ceramic material positioned within the mold cavity. A molten metal alloy is introduced around the ceramic core and cooled to form the component, and the outer wall of the component is defined between the ceramic core and an interior wall of the mold cavity. However, an ability to produce a consistent preselected outer wall thickness of the cast component depends on an ability to precisely position the core relative to the mold to define the cavity space between the core and the mold. For example, the core is positioned with respect to the mold cavity by a plurality of platinum locating pins. Such precise and consistent positioning, for example using the plurality of pins, is complex and labor-intensive in at least some cases, and leads to a reduced yield rate for successfully cast components, in particular for, but not limited to, cases in which a preselected outer wall thickness of the component is relatively thin. In addition, in at least some cases, the core and mold shift, shrink, and/or twist with respect to each other during the final firing before the casting pour, thereby altering the initial cavity space dimensions between the core and the mold and, consequently, the thickness of the outer wall of the cast component. Moreover, at least some known ceramic cores are fragile, resulting in cores that are difficult and expensive to produce and handle without damage during the complex and labor-intensive process.

Alternatively or additionally, at least some known components having a preselected outer wall thickness are formed by drilling and/or otherwise machining the component to obtain the outer wall thickness, such as, but not limited to, using an electrochemical machining process. However, at least some such machining processes are relatively time-consuming and expensive. Moreover, at least some such machining processes cannot produce an outer wall having the preselected thickness, shape, and/or curvature required for certain component designs.

BRIEF DESCRIPTION

In one aspect, a mold assembly for use in forming a component from a component material is provided. The component includes an outer wall of a predetermined thickness. The mold assembly includes a mold that includes an interior wall that defines a mold cavity within the mold. The mold assembly also includes a jacketed core positioned with respect to the mold. The jacketed core includes a jacket that includes an outer wall. The jacketed core also includes a core positioned interiorly of the jacket outer wall. The jacket separates a perimeter of the core from the mold interior wall by the predetermined thickness, such that the outer wall is formable between the perimeter and the interior wall.

In another aspect, a method of forming a component having an outer wall of a predetermined thickness is provided. The method includes introducing a component material in a molten state into a mold assembly. The mold assembly includes a jacketed core positioned with respect to a mold. The mold includes an interior wall that defines a mold cavity within the mold. The jacketed core includes a jacket that includes an outer wall. The jacketed core also includes a core positioned interiorly of the jacket outer wall. The jacket separates the core perimeter from the mold interior wall by the predetermined thickness. The method also includes cooling the component material to form the component. The perimeter and the interior wall cooperate to define the outer wall of the component therebetween.

DRAWINGS

Figure 18:
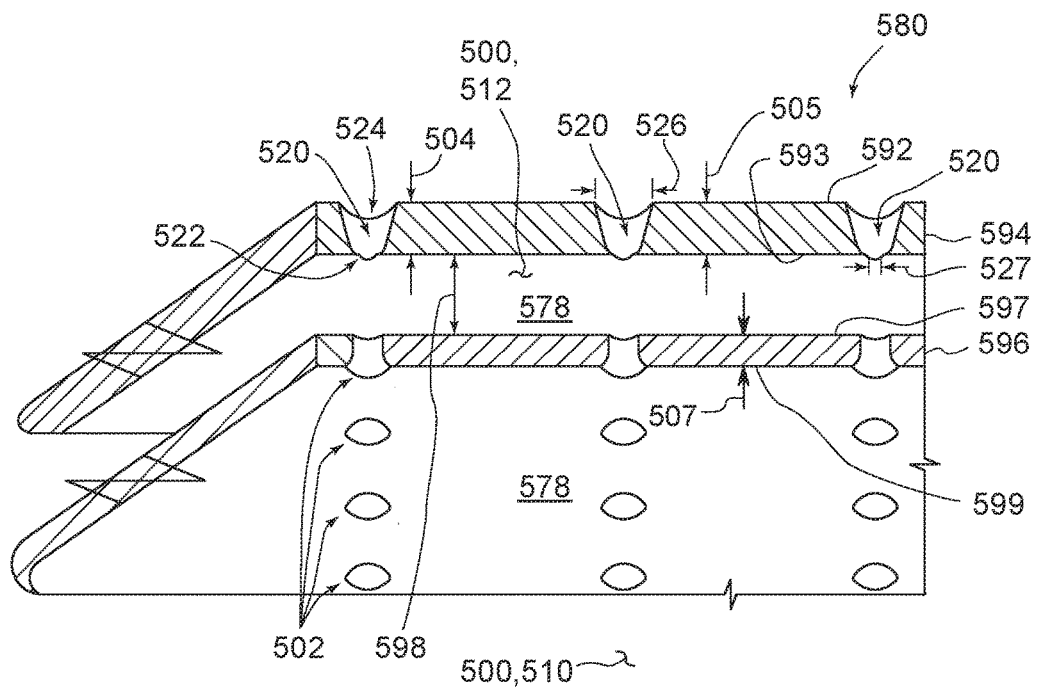
FIG. 18 is a schematic perspective sectional view of another exemplary precursor component that may be used to form the component shown in FIGS. 2-4.
Figure 20:
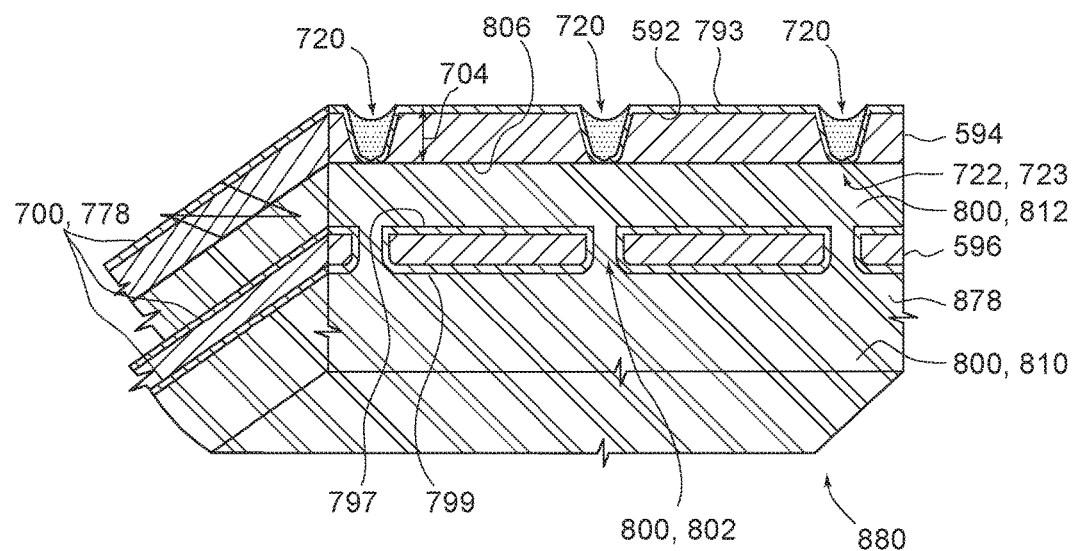
FIG. 20 is a schematic perspective sectional view of a portion of another exemplary jacketed cored precursor component that includes an exemplary core within the jacketed precursor component shown in FIG. 19.
Figure 21:
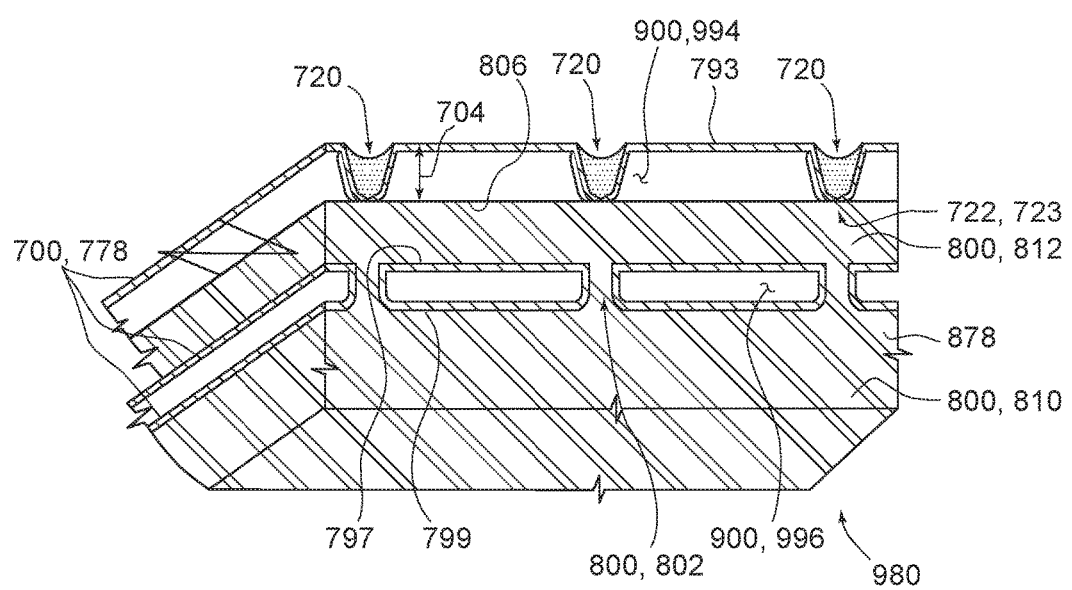
Figure 22:
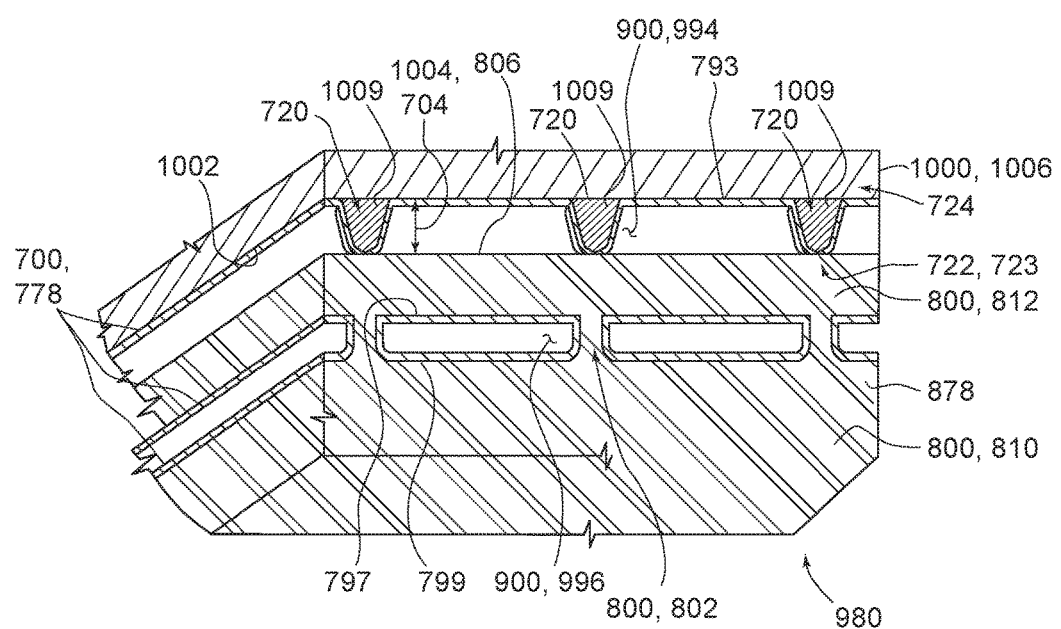

FIG. 21 is a schematic perspective sectional view of a portion of another exemplary jacketed core that includes portions of the exemplary jacketed cored precursor component shown in FIG. 20 other than the precursor component shown in FIG. 18; and FIG. 22 is a schematic perspective sectional view of a portion of another exemplary mold assembly including the portion of the exemplary jacketed core shown in FIG. 21.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming a component having an outer wall of a predetermined thickness. The embodiments described herein include forming a precursor component shaped to correspond to a shape of at least portions of the component, and forming a jacket around the precursor component. A core is added to the jacketed precursor component, and the precursor component material is removed to form a jacketed core. Alternatively, the jacketed core includes a jacket formed without the precursor component, and/or a core formed in a separate core-forming process. The jacketed core is positioned with respect to a mold, such that the jacket separates a perimeter of the core from an interior wall of the mold by the predetermined thickness. When molten component material is added to the mold, the core perimeter and mold interior wall cooperate to define the outer wall of the component therebetween.

Figure 1:
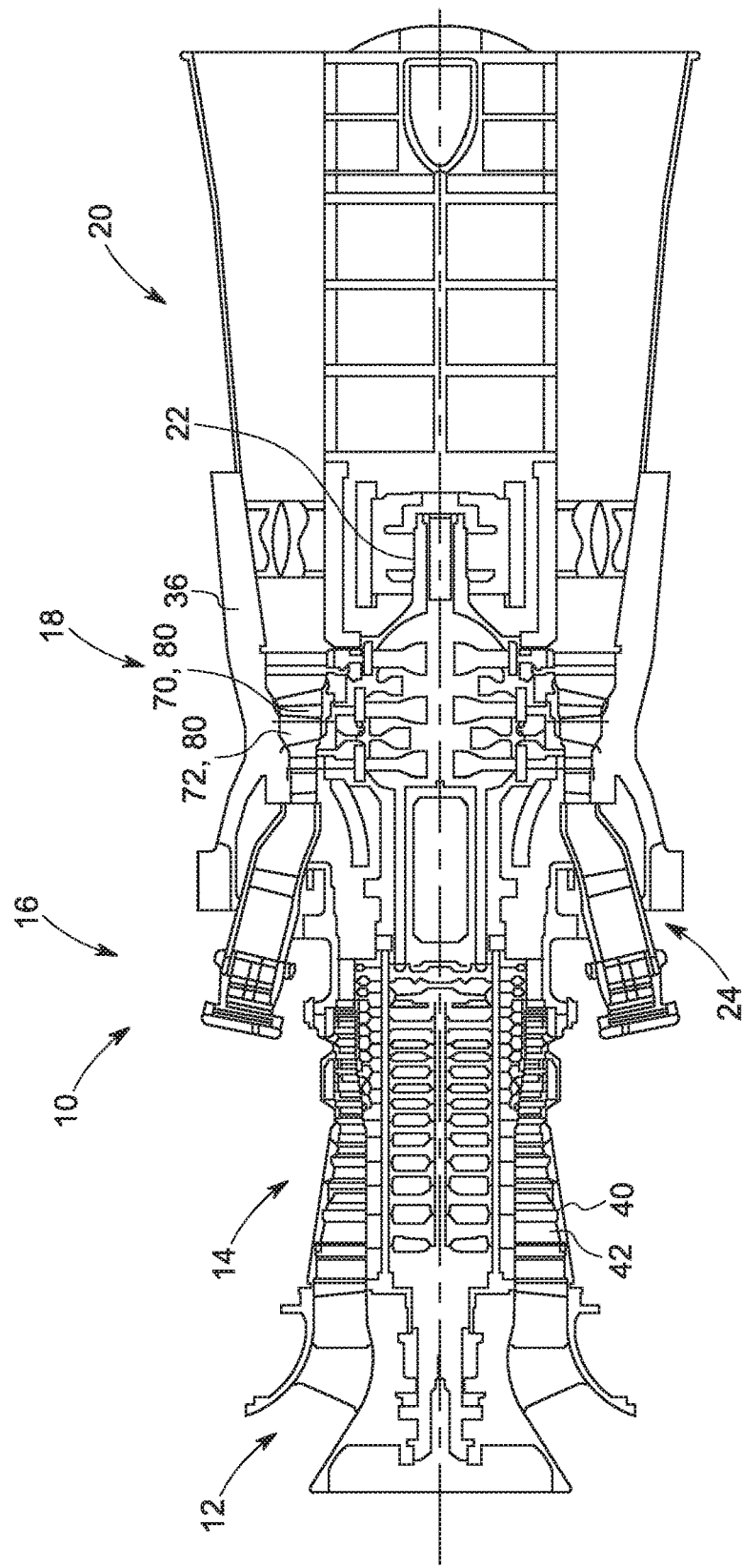
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component suitably formed with a preselected outer wall thickness.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed with a preselected outer wall thickness.

Figure 2:
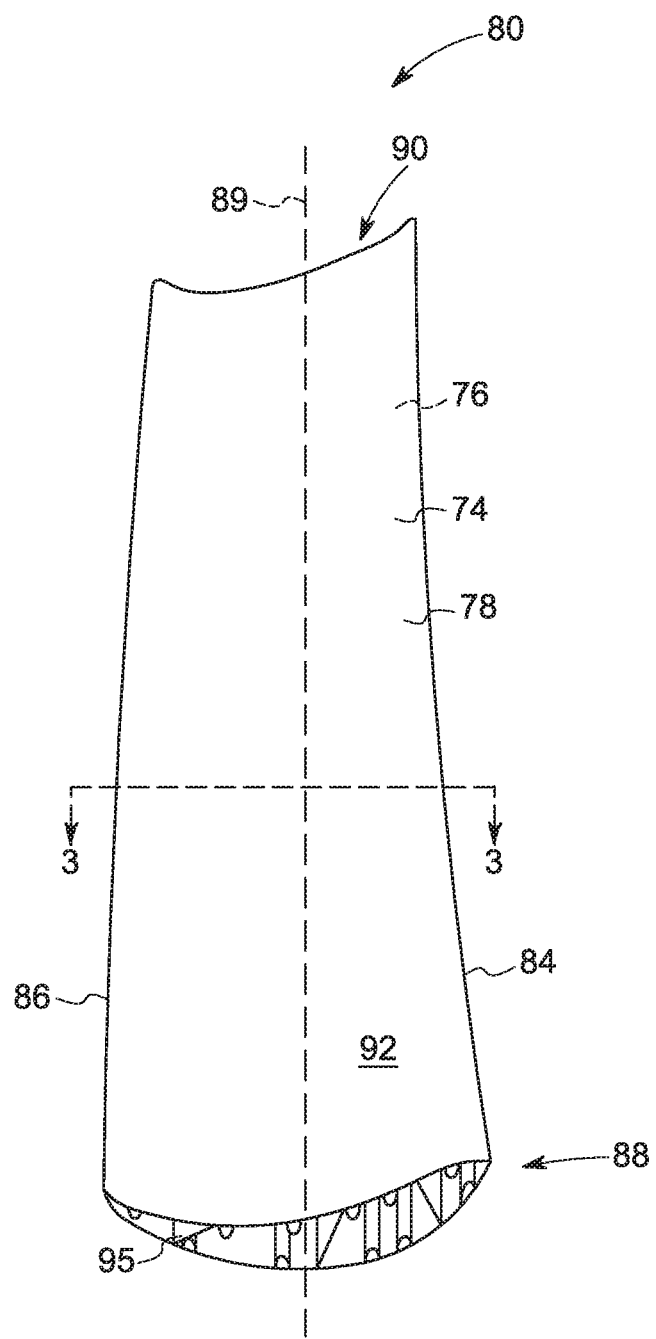
FIG. 2 is a schematic perspective view of an exemplary component for use with the rotary machine shown in FIG. 1.
Figure 3:
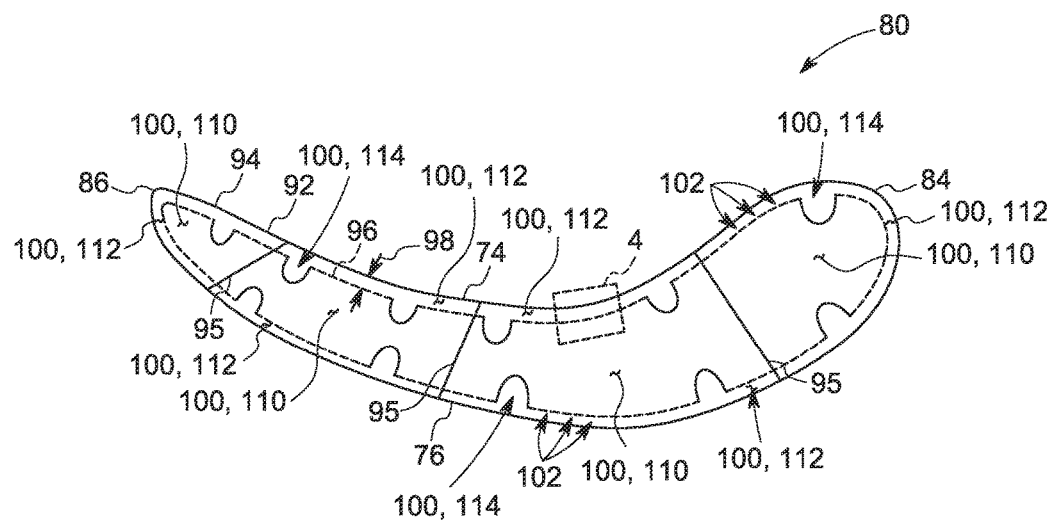
FIG. 3 is a schematic cross-section of the component shown in FIG. 2, taken along lines 3-3 shown in FIG. 2.
Figure 4:
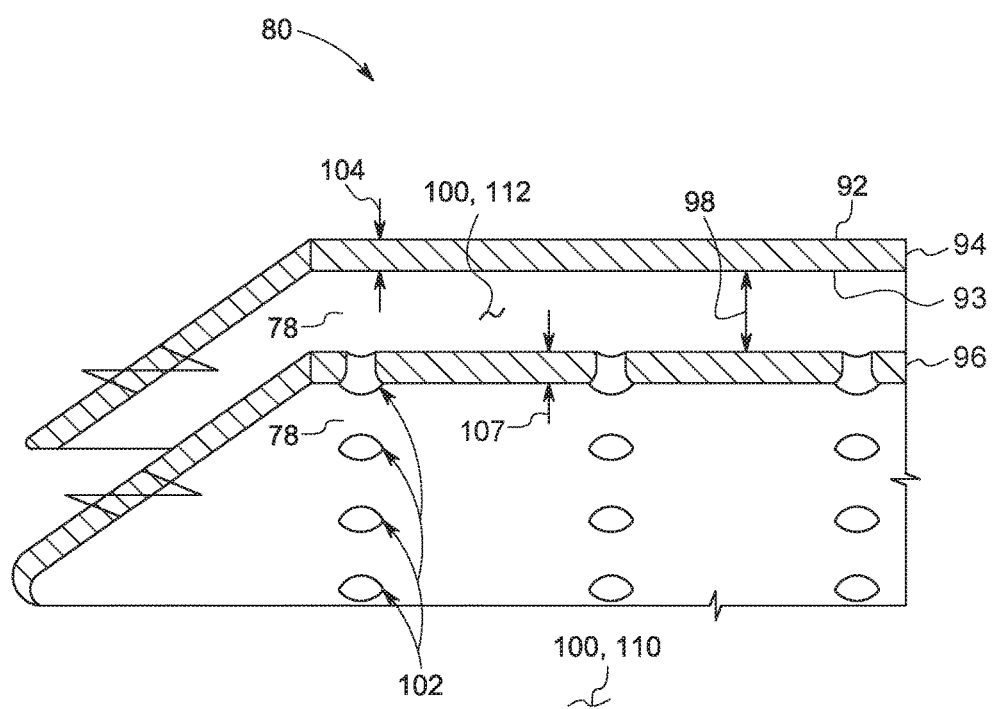
FIG. 4 is a schematic perspective sectional view of a portion of the component shown in FIGS. 2 and 3, designated as portion 4 in FIG. 3.

FIG. 2 is a schematic perspective view of an exemplary component 80, illustrated for use with rotary machine 10 (shown in FIG. 1). FIG. 3 is a schematic cross-section of component 80, taken along lines 3-3 shown in FIG. 2. FIG. 4 is a schematic perspective sectional view of a portion of component 80, designated as portion 4 in FIG. 3. With reference to FIGS. 2-4, component 80 includes an outer wall 94 having a preselected thickness 104. Moreover, in the exemplary embodiment, component 80 includes at least one internal void 100 defined therein. For example, a cooling fluid is provided to internal void 100 during operation of rotary machine 10 to facilitate maintaining component 80 below a temperature of the hot combustion gases.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to be formed as described herein.

In the exemplary embodiment, component 80 is one of rotor blades 70 or stator vanes 72. In alternative embodiments, component 80 is another suitable component of rotary machine 10 that is capable of being formed with a preselected outer wall thickness as described herein. In still other embodiments, component 80 is any component for any suitable application that is suitably formed with a preselected outer wall thickness.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90. A longitudinal axis 89 of component 80 is defined between root end 88 and tip end 90. In alternative embodiments, rotor blade 70, or alternatively stator vane 72, has any suitable configuration that is capable of being formed with a preselected outer wall thickness as described herein.

Outer wall 94 at least partially defines an exterior surface 92 of component 80, and a second surface 93 opposite exterior surface 92. In the exemplary embodiment, outer wall 94 extends circumferentially between leading edge 84 and trailing edge 86, and also extends longitudinally between root end 88 and tip end 90. In alternative embodiments, outer wall 94 extends to any suitable extent that enables component 80 to function for its intended purpose. Outer wall 94 is formed from component material 78.

In addition, in certain embodiments, component 80 includes an inner wall 96 having a preselected thickness 107. Inner wall 96 is positioned interiorly to outer wall 94, and the at least one internal void 100 includes at least one plenum 110 that is at least partially defined by inner wall 96 and interior thereto. In the exemplary embodiment, each plenum 110 extends from root end 88 to proximate tip end 90. In alternative embodiments, each plenum 110 extends within component 80 in any suitable fashion, and to any suitable extent, that enables component 80 to be formed as described herein. In the exemplary embodiment, the at least one plenum 110 includes a plurality of plenums 110, each defined by inner wall 96 and at least one partition wall 95 that extends at least partially between pressure side 74 and suction side 76. For example, in the illustrated embodiment, each partition wall 95 extends from outer wall 94 of pressure side 74 to outer wall 94 of suction side 76. In alternative embodiments, at least one partition wall 95 extends from inner wall 96 of pressure side 74 to inner wall 96 of suction side 76. Additionally or alternatively, at least one partition wall 95 extends from inner wall 96 to outer wall 94 of pressure side 74, and/or from inner wall 96 to outer wall 94 of suction side 76. In other alternative embodiments, the at least one internal void 100 includes any suitable number of plenums 110 defined in any suitable fashion. Inner wall 96 is formed from component material 78.

Moreover, in some embodiments, at least a portion of inner wall 96 extends circumferentially and longitudinally adjacent at least a portion of outer wall 94 and is separated therefrom by an offset distance 98, such that the at least one internal void 100 also includes at least one chamber 112 defined between inner wall 96 and outer wall 94. In the exemplary embodiment, the at least one chamber 112 includes a plurality of chambers 112 each defined by outer wall 94, inner wall 96, and at least one partition wall 95. In alternative embodiments, the at least one chamber 112 includes any suitable number of chambers 112 defined in any suitable fashion. In the exemplary embodiment, inner wall 96 includes a plurality of apertures 102 defined therein and extending therethrough, such that each chamber 112 is in flow communication with at least one plenum 110.

In the exemplary embodiment, offset distance 98 is selected to facilitate effective impingement cooling of outer wall 94 by cooling fluid supplied through plenums 110 and emitted through apertures 102 defined in inner wall 96. For example, but not by way of limitation, offset distance 98 varies circumferentially and/or longitudinally along component 80 to facilitate local cooling requirements along respective portions of outer wall 94. In alternative embodiments, component 80 is not configured for impingement cooling, and offset distance 98 is selected in any suitable fashion.

In certain embodiments, the at least one internal void 100 further includes at least one return channel 114 at least partially defined by inner wall 96. Each return channel 114 is in flow communication with at least one chamber 112, such that each return channel 114 provides a return fluid flow path for fluid used for impingement cooling of outer wall 94. In the exemplary embodiment, each return channel 114 extends from root end 88 to proximate tip end 90. In alternative embodiments, each return channel 114 extends within component 80 in any suitable fashion, and to any suitable extent, that enables component 80 to be formed as described herein. In the exemplary embodiment, the at least one return channel 114 includes a plurality of return channels 114, each defined by inner wall 96 adjacent one of chambers 112. In alternative embodiments, the at least one return channel 114 includes any suitable number of return channels 114 defined in any suitable fashion.

For example, in some embodiments, cooling fluid is supplied to plenums 110 through root end 88 of component 80. As the cooling fluid flows generally towards tip end 90, portions of the cooling fluid are forced through apertures 102 into chambers 112 and impinge upon outer wall 94. The used cooling fluid then flows into return channels 114 and flows generally toward root end 88 and out of component 80. In some such embodiments, the arrangement of the at least one plenum 110, the at least one chamber 112, and the at least one return channel 114 forms a portion of a cooling circuit of rotary machine 10, such that used cooling fluid is returned to a working fluid flow through rotary machine 10 upstream of combustor section 16 (shown in FIG. 1). Although impingement flow through plenums 110 and chambers 112 and return flow through channels 114 is described in terms of embodiments in which component 80 is rotor blade 70 and/or stator vane 72, it should be understood that this disclosure contemplates a circuit of plenums 110, chambers 112, and return channels 114 for any suitable component 80 of rotary machine 10, and additionally for any suitable component 80 for any other application suitable for closed circuit fluid flow through a component. Such embodiments provide an improved operating efficiency for rotary machine 10 as compared to cooling systems that exhaust used cooling fluid directly from component 80 into the working fluid within turbine section 18. In alternative embodiments, the at least one internal void 100 does not include return channels 114. For example, but not by way of limitation, outer wall 94 includes openings extending therethrough (not shown), and the cooling fluid is exhausted into the working fluid through the outer wall openings to facilitate film cooling of exterior surface 92. In other alternative embodiments, component 80 includes both return channels 114 and openings (not shown) extending through outer wall 94, a first portion of the cooling fluid is returned to a working fluid flow through rotary machine 10 upstream of combustor section 16 (shown in FIG. 1), and a second portion of the cooling fluid is exhausted into the working fluid through the outer wall openings to facilitate film cooling of exterior surface 92.

Although the at least one internal void 100 is illustrated as including plenums 110, chambers 112, and return channels 114 for use in cooling component 80 that is one of rotor blades 70 or stator vanes 72, it should be understood that in alternative embodiments, component 80 is any suitable component for any suitable application, and includes any suitable number, type, and arrangement of internal voids 100 that enable component 80 to function for its intended purpose.

With particular reference to FIG. 4, in certain embodiments, outer wall 94 has a thickness 104 preselected to facilitate impingement cooling of outer wall 94 with a reduced amount of cooling fluid flow as compared to components having thicker outer walls. In alternative embodiments, outer wall thickness 104 is any suitable thickness that enables component 80 to function for its intended purpose. In certain embodiments, outer wall thickness 104 varies along outer wall 94. In alternative embodiments, outer wall thickness 104 is constant along outer wall 94.

In some embodiments, apertures 102 each have a substantially circular cross-section. In alternative embodiments, apertures 102 each have a substantially ovoid cross-section. In other alternative embodiments, apertures 102 each have any suitable shape that enables apertures 102 to be function as described herein.

Figure 5:
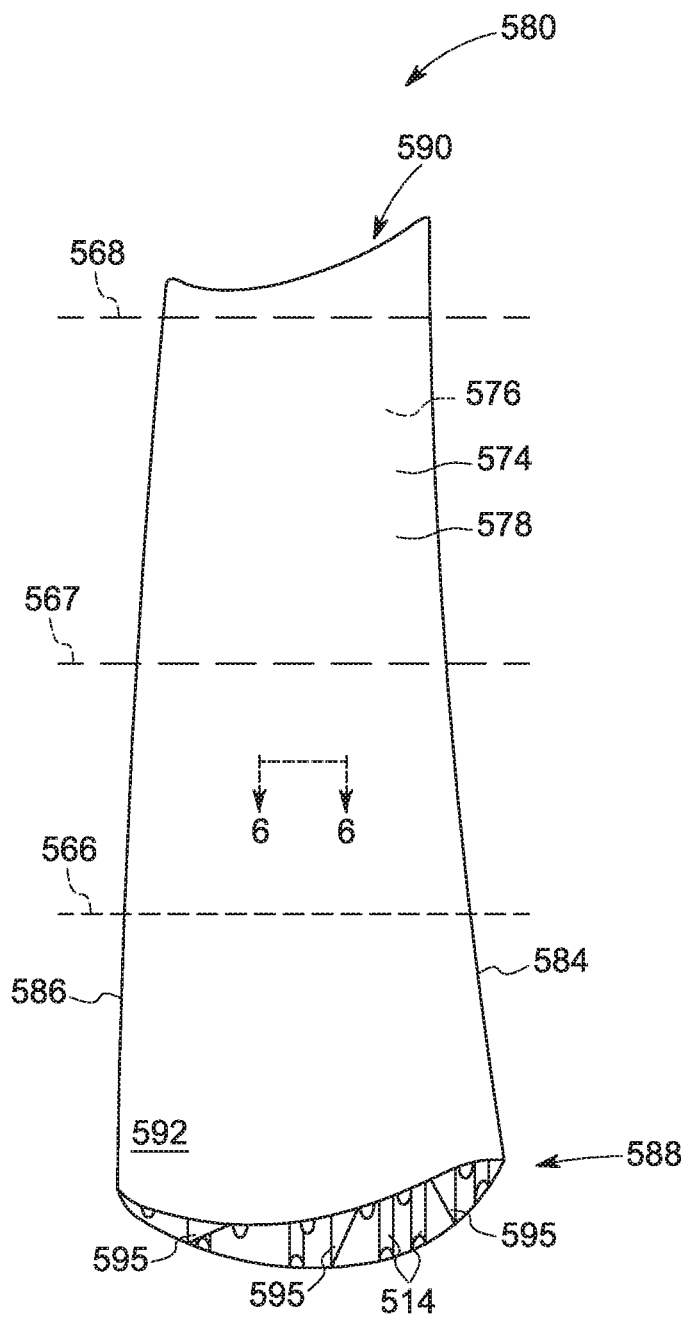
FIG. 5 is a schematic perspective view of an exemplary precursor component that may be used to form the component shown in FIGS. 2-4.
Figure 6:
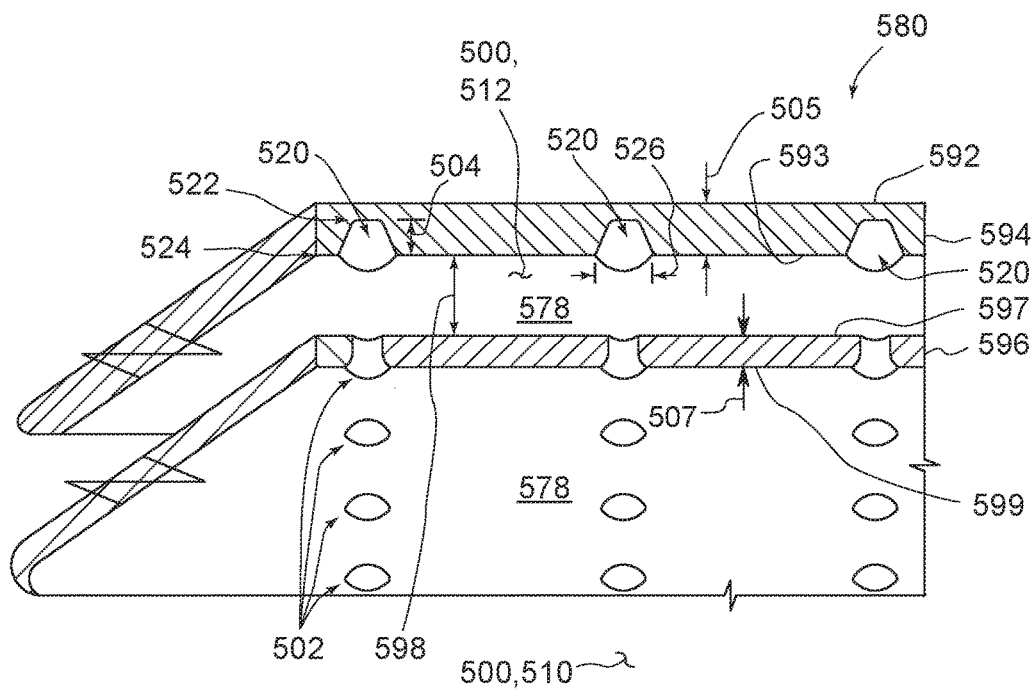
FIG. 6 is a schematic perspective sectional view of a portion of the exemplary precursor component shown in FIG. 5, taken along lines 6-6 in FIG. 5 and corresponding to the portion of the exemplary component shown in FIG. 4.

FIG. 5 is a schematic perspective view of an exemplary precursor component 580 that may be used to form component 80 shown in FIGS. 2-4. FIG. 6 is a schematic perspective sectional view of a portion of an embodiment of precursor component 580, taken along lines 6-6 in FIG. 5, and corresponding to the portion of component 80 shown in FIG. 4. With reference to FIGS. 2-6, precursor component 580 is formed from a precursor material 578 and has a shape corresponding to a shape of at least portions of component 80. More specifically, in certain embodiments, precursor component 580 has a shape corresponding to the shape of component 80, except an outer wall 594 of precursor component 580 includes at least one indentation 520 defined therein. In other words, the at least one indentation 520 does not correspond to a feature of outer wall 94 of component 80. In alternative embodiments, outer wall 94 includes openings extending therethrough (not shown), for example to facilitate film cooling of exterior surface 92 of component 80 as described above, and precursor component indentations 520 are positioned and shaped to correspond to the openings defined through outer wall 94. In other alternative embodiments, precursor component 580 does not include the at least one indentation 520. Also in the exemplary embodiment, outer wall 594 of precursor component 580 has a thickness 505 larger than thickness 104 of component outer wall 94. In alternative embodiments, thickness 505 is equal to thickness 104 or reduced relative to thickness 104 by a thickness 706 of a jacket 700 to be applied to outer wall 594, as will be described herein. Additionally, in some embodiments, a thickness 507 of inner wall 596 is reduced relative to thickness 107 of inner wall 96 by twice thickness 706 of jacket 700 to be applied to inner wall 596, as will be described herein. Alternatively, thickness 507 is not reduced relative to thickness 107.

For example, in the exemplary embodiment in which component 80 is one of rotor blades 70 or stator vanes 72 (shown in FIG. 1), precursor component 580 includes a pressure side 574 and an opposite suction side 576, a first end 588 and an opposite second end 590, and a leading edge 584 and an opposite trailing edge 586 shaped to correspond to pressure side 74, suction side 76, root end 88, tip end 90, leading edge 84, and trailing edge 86 of component 80, with the exception, in some embodiments as described above, for outer wall 594.

In addition, precursor component 580 includes at least one internal void 500 that has a shape corresponding to the at least one void 100 of component 80. For example, in the exemplary embodiment, precursor component 580 includes at least one plenum 510, at least one chamber 512, and at least one return channel 514 corresponding to the at least one plenum 110, the at least one chamber 112, and the at least one return channel 114 of component 80. Moreover, precursor component 580 includes an inner wall 596 corresponding to inner wall 96 of component 80, and inner wall apertures 502 defined in inner wall 596 corresponding to apertures 102 of component 80. In alternative embodiments, inner wall 596 does not include inner wall apertures 502. For example, but not by way of limitation, component 80 is initially formed without inner wall apertures 102, and inner wall apertures 102 are added to component 80 in a subsequent process such as, but not limited to, mechanical drilling, electric discharge machining, or laser drilling. In some embodiments, precursor component 580 further includes at least one partition wall 595 that extends at least partially between pressure side 574 and suction side 576, corresponding to the at least one partition wall 95 of component 80 as described above. For example, in the illustrated embodiment, each partition wall 595 extends from outer wall 594 of pressure side 574 to outer wall 594 of suction side 576. In alternative embodiments, at least one partition wall 595 extends from inner wall 596 of pressure side 574 to inner wall 596 of suction side 576. Additionally or alternatively, at least one partition wall 595 extends from inner wall 596 to outer wall 594 of pressure side 574, and/or from inner wall 596 to outer wall 594 of suction side 576.

In addition, precursor component 580 includes outer wall 594 that at least partially defines an exterior surface 592 of precursor component 580. A second surface 593 of outer wall 594 is defined opposite exterior surface 592. Inner wall 596 extends circumferentially and longitudinally adjacent at least a portion of outer wall 594 and is separated therefrom by an offset distance 598, corresponding to offset distance 98 of component 80. A shape of outer wall 594 and second surface 593 correspond to the shape of outer wall 94 and second surface 93 of component 80, except that, in the exemplary embodiment, the at least one indentation 520 is defined in second surface 593, and outer wall 594 additionally includes increased thickness 505 relative to thickness 104 of component outer wall 94, as described above. In certain embodiments, the at least one outer wall indentation 520 facilitates forming at least one stand-off structure 720 (shown in FIG. 7) that facilitates maintaining an offset between a core 800 (shown in FIG. 8) and a mold 1000 (shown in FIG. 10) used to form component 80, as will be described herein. In alternative embodiments, precursor component 580 does not include outer wall indentation 520, and the at least one stand-off structure is formed by another suitable method, as will be described herein.

In alternative embodiments, component 80 is any suitable component for any suitable application, and precursor component 580 has a shape that corresponds to the shape of such component 80, except that in certain embodiments outer wall 594 includes at least one indentation 520 that does not correspond to a feature of outer wall 94 of component 80, and includes an increased thickness 505 relative to outer wall 94 of component 80.

In the exemplary embodiment, outer wall indentations 520 each extend from a first end 522 to a second end 524. Second end 524 is defined in second surface 593 of outer wall 594 opposite exterior surface 592. In certain embodiments, a diameter 526 of outer wall indentations 520 at second end 524 is selected to enable a jacket 700 (shown in FIG. 7) formed on second surface 593 to extend into indentation 520 from second end 524 to first end 522, as will be described herein. In the exemplary embodiment, outer wall indentations 520 each define a generally frusto-conical shape within outer wall 594. In alternative embodiments, each outer wall indentation 520 defines any suitable shape that enables outer wall indentations 520 to function as described herein.

In the exemplary embodiment, each indentation 520 defines a depth 504 that is reduced relative to thickness 104 of outer wall 94 by twice a thickness 706 of a jacket 700 to be applied to outer wall 594, as will be described herein. In alternative embodiments, depth 504 is not reduced relative to thickness 104. In the exemplary embodiment, depth 504 is less than thickness 505 of outer wall 594, such that indentations 520 do not extend completely through outer wall 594. Depth 504 less than thickness 505 prevents an opening corresponding to indentation 520 from being formed in outer wall 94 when component 80 is formed. In alternative embodiments, depth 504 is equal to thickness 505, such that indentations 520 extend completely through outer wall 594. In some alternative embodiments in which outer wall 94 includes openings extending therethrough, as described above, outer wall indentations 520 are sized to correspond to the openings, enabling later formation of the openings extending through outer wall 94.

FIG. 18 is a schematic perspective sectional view of a portion of another embodiment of precursor component 580, taken along lines 6-6 in FIG. 5, and corresponding to the portion of component 80 shown in FIG. 4. The illustrated embodiment is substantially identical to the embodiment shown in FIG. 6, except that outer wall indentations 520 depend into outer wall 594 from exterior surface 592, rather than from second surface 593. More specifically, in the illustrated embodiment, second end 524 is defined in exterior surface 592, and first end 522 is located within outer wall 594 at depth 504. In addition, depth 504 is approximately equal to thickness 505 of outer wall 594, such that indentations 520 extend completely through outer wall 594, and a diameter 527 of outer wall apertures 520 at first end 522 is selected to enable a jacket outer wall 793 (shown in FIG. 19) applied to exterior surface 592 to form a closure 723 (shown in FIG. 19) at first end 522 of outer wall apertures 520, as will be described herein.

With reference to FIGS. 2-6 and 18, in some embodiments, precursor component 580 is formed at least partially using a suitable additive manufacturing process, and precursor material 578 is selected to facilitate additive manufacture of precursor component 580. For example, a computer design model of precursor component 580 is developed from a computer design model of component 80, with some embodiments including outer wall thickness 505 increased and/or outer wall indentations 520 added, as described above, in the computer design model for precursor component 580. The computer design model for precursor component 580 is sliced into a series of thin, parallel planes between first end 588 and second end 590 of precursor component 580. A computer numerically controlled (CNC) machine deposits successive layers of precursor material 578 from first end 588 to second end 590 in accordance with the model slices to form precursor component 580. Three such representative layers are indicated as layers 566, 567, and 568.

In some such embodiments, precursor material 578 is selected to be a photopolymer, and the successive layers of precursor material 578 are deposited using a stereolithographic process. Alternatively, precursor material 578 is selected to be a thermoplastic, and the successive layers of precursor material 578 are deposited using at least one of a fused filament fabrication process, an inkjet/powder bed process, a selective heat sintering process, and a selective laser sintering process. Additionally or alternatively, precursor material 578 is selected to be any suitable material, and the successive layers of precursor material 578 are deposited using any suitable process that enables precursor component 580 to be formed as described herein. It should be understood that in certain embodiments, precursor component 580 is formed from a plurality of separately additively manufactured sections that are subsequently coupled together in any suitable fashion, as described generally herein with respect to FIG. 13.

In certain embodiments, the formation of precursor component 580 by an additive manufacturing process enables precursor component 580 to be formed with a nonlinearity, structural intricacy, precision, and/or repeatability that is not achievable by other methods. Accordingly, the formation of precursor component 580 by an additive manufacturing process enables the complementary formation of core 800 (shown in FIG. 8), and thus of component 80, with a correspondingly increased nonlinearity, structural intricacy, precision, and/or repeatability. Additionally or alternatively, the formation of precursor component 580 using an additive manufacturing process enables the formation of internal voids 500 that could not be reliably added to component 80 in a separate process after initial formation of component 80 in a mold. Moreover, in some embodiments, the formation of precursor component 580 by an additive manufacturing process using precursor material 578 that is a photopolymer or thermoplastic decreases a cost and/or a time required for manufacture of component 80, as compared to forming component 80 directly by additive manufacture using a metallic component material 78.

In alternative embodiments, precursor component 580 is formed in any suitable fashion that enables precursor component 580 to function as described herein. For example, but not by way of limitation, a suitable pattern material, such as wax, is injected into a suitable pattern die to form precursor component 580. Again, it should be understood that in certain embodiments, precursor component 580 is formed from a plurality of separately formed sections that are subsequently coupled together in any suitable fashion, as described generally herein with respect to FIG. 12.

Figure 7:
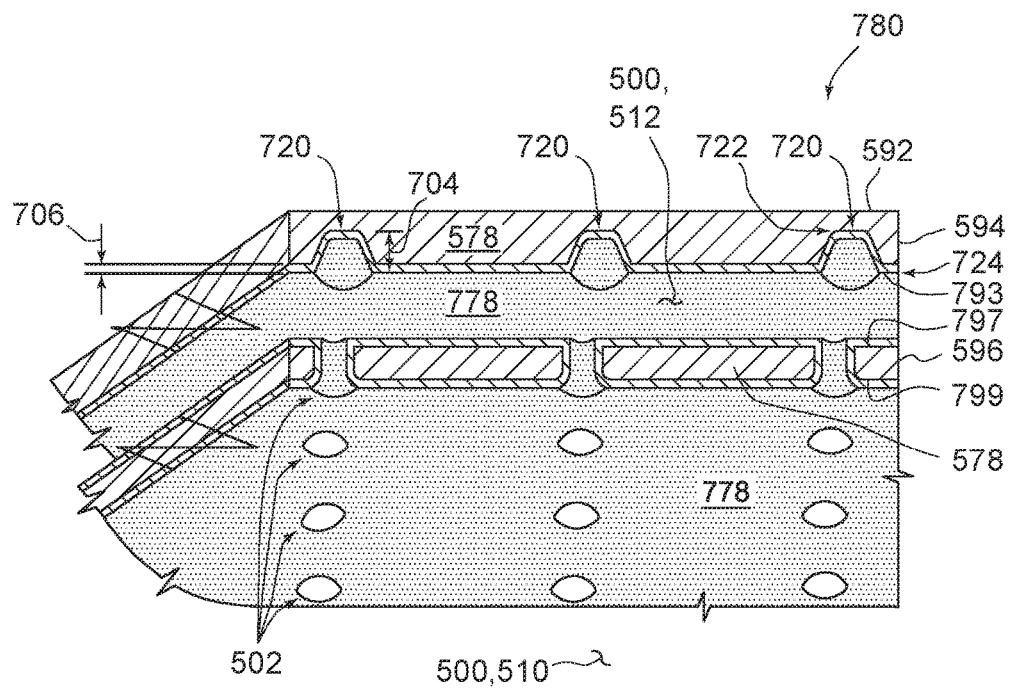
FIG. 7 is a schematic perspective sectional view of a portion of an exemplary jacketed precursor component that includes an exemplary jacket coupled to the exemplary precursor component shown in FIG. 6.
Figure 19:
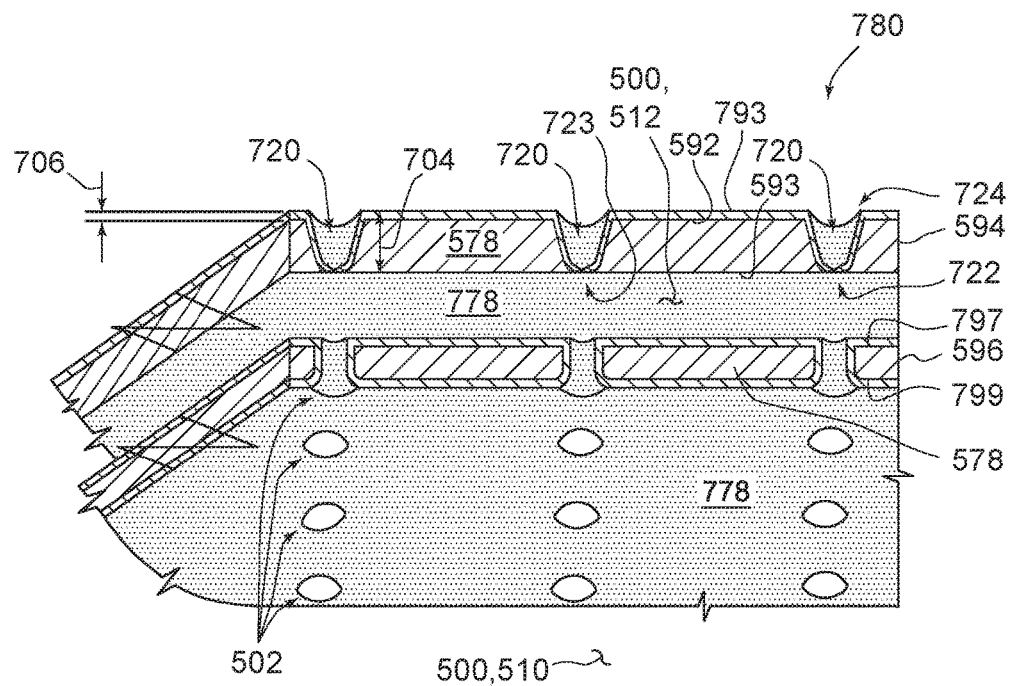
FIG. 19 is a schematic perspective sectional view of a portion of another exemplary jacketed precursor component that includes an exemplary jacket coupled to the exemplary precursor component shown in FIG. 18.

FIG. 7 is a schematic perspective sectional view of a portion of an exemplary jacketed precursor component 780 that includes an exemplary jacket 700 coupled to the embodiment of precursor component 580 shown in FIG. 6. FIG. 19 is a schematic perspective sectional view of a portion of another exemplary jacketed precursor component 780 that includes exemplary jacket 700 coupled to the embodiment of precursor component 580 shown in FIG. 18. With reference to FIGS. 4-7, 18, and 19, in certain embodiments, jacket 700 includes at least one layer of a jacket material 778 adjacent at least a portion of a surface of precursor component 580. More specifically, in certain embodiments, jacket 700 includes a jacket outer wall 793 adjacent precursor component outer wall 594. Jacket outer wall 793 has a shape corresponding to a portion of precursor component outer wall 594. For example, in the exemplary embodiment shown in FIG. 7, jacket outer wall 793 includes jacket material 778 adjacent second surface 593 of outer wall 594, such that jacket outer wall 793 is positioned interiorly from exterior surface 592. For another example, in the exemplary embodiment shown in FIG. 19 in which outer wall indentations 520 are defined in exterior surface 592 (as shown in FIG. 18), jacket outer wall 793 includes jacket material 778 adjacent exterior surface 592 of outer wall 594, such that jacket outer wall 793 is positioned exteriorly from exterior surface 592.

Additionally, jacket outer wall 793 is positioned adjacent outer wall indentations 520, such that each jacketed outer wall indentation 520 defines a respective stand-off structure 720 of jacket 700. More specifically, each stand-off structure 720 extends from a first end 722, adjacent first end 522 of the corresponding outer wall indentation 520, to a second end 724, adjacent second end 524 of the corresponding outer wall indentation 520. Stand-off structures 720 are configured to separate perimeter 806 of core 800 from interior wall 1002 of mold 1000 (shown in FIG. 12) by thickness 104.

More specifically, in certain embodiments, as discussed above, depth 504 of indentations 520 is reduced relative to thickness 104 of outer wall 94 by twice thickness 706 of jacket 700, such that a combined thickness 704 of stand-off structure 720, including thickness 706 of jacket outer wall 793 at first end 722, depth 504 of indentation 520, and thickness 706 of jacket outer wall 793 at second end 724, corresponds to thickness 104 of outer wall 94 of component 80. Alternatively, depth 504 is not reduced relative to thickness 104, and thickness 706 of jacket 700 is relatively small compared to thickness 104, such that combined thickness 704 of each stand-off structure 720 from first end 722 to second end 724, including thickness 706 of jacket outer wall 793 at first end 722, depth 504 of indentation 520, and thickness 706 of jacket outer wall 793 at second end 724, corresponds to thickness 104 of outer wall 94 of component 80. Additionally, in certain embodiments, as discussed above, thickness 507 of inner wall 596 is reduced relative to thickness 107 of inner wall 96 by twice thickness 706 of jacket 700, such that a combined thickness of a first jacket inner wall 797, a second jacket inner wall 799, and inner wall 596 corresponds to thickness 107 of inner wall 96 of component 80. Alternatively, thickness 507 is not reduced relative to thickness 107, and thickness 706 of jacket 700 is relatively small compared to thickness 507, such that combined thickness of first jacket inner wall 797, second jacket inner wall 799, and inner wall 596 approximately corresponds to thickness 107 of inner wall 96 of component 80.

In alternative embodiments, the at least one stand-off structure 720 has any suitable structure and/or is formed in any suitable fashion. For example, but not by way of limitation, precursor component 580 does not include outer wall indentations 520. In some such embodiments, jacket outer wall 793 is locally extended to combined thickness 704 using a metal stamp (not shown) that locally projects jacket outer wall 793 into outer wall 594 to form a respective stand-off structure 720.

In the exemplary embodiment, jacket material 778 also is adjacent opposing surfaces 597 and 599 of inner wall 596 to form opposing jacket inner walls 797 and 799 positioned interiorly from jacket outer wall 793. Further in the exemplary embodiment, jacket material 778 is adjacent inner wall 596 adjacent inner wall apertures 502, such that inner wall apertures 502 jacketed by jacket material 778 extend through inner wall 596. Moreover, in certain embodiments, jacketed precursor component 780 continues to define the at least one internal void 500 that has a shape corresponding to the at least one void 100 of component 80. For example, in the exemplary embodiment, jacketed precursor component 780 includes at least one plenum 510, at least one chamber 512, and at least one return channel 514 (shown in FIG. 5). In some embodiments, jacket 700 further is adjacent opposing surfaces of partition walls 595 (shown in FIG. 5). Additionally or alternatively, jacket 700 is adjacent any suitable portion of the surface of precursor component 580 that enables jacketed precursor component 780 to function as described herein.

In the exemplary embodiment, jacket 700 has a substantially uniform thickness 706. In alternative embodiments, thickness 706 varies over at least some portions of jacket 700. In certain embodiments, thickness 706 is selected to be small relative to outer wall thickness 104. In some embodiments, thickness 706 also is selected such that stand-off structures 720 and/or other portions of jacket 700 provide at least a minimum selected structural stiffness such that combined thickness 704 of stand-off structures 720 is maintained when precursor material 578 is not positioned adjacent jacket outer wall 793, as will be described herein.

In certain embodiments, jacket material 778 is selected to be at least partially absorbable by molten component material 78. For example, component material 78 is an alloy, and jacket material 778 is at least one constituent material of the alloy. Moreover, in some embodiments, jacket material 778 includes a plurality of materials disposed on precursor component 580 in successive layers, as will be described herein.

Figure 10:
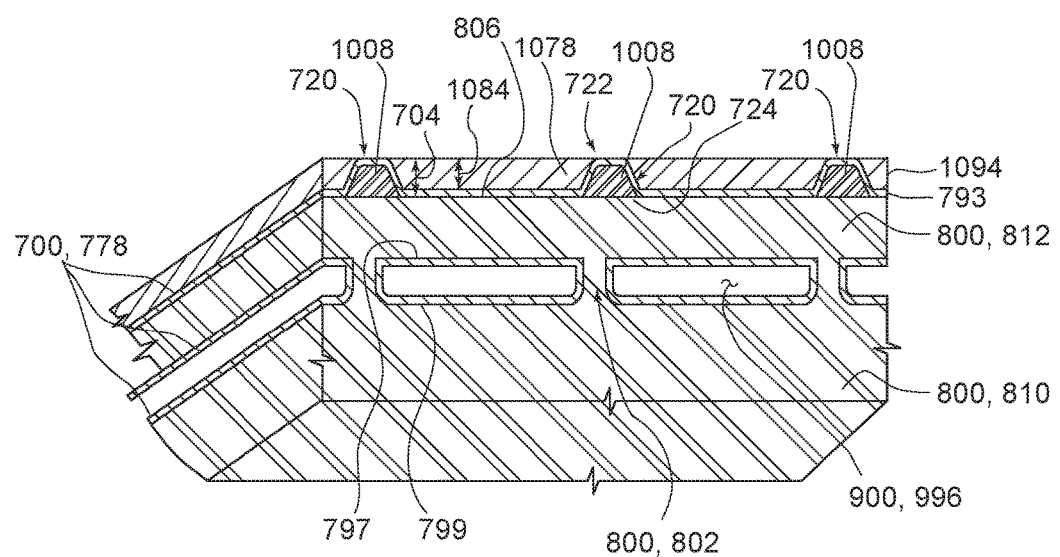
FIG. 10 is a schematic perspective sectional view of an exemplary spacer material coupled adjacent an exterior surface of the jacketed core shown in FIG. 9.

For example, in the exemplary embodiment, component material 78 is a nickel-based superalloy, and jacket material 778 is substantially nickel, such that jacket material 778 is compatible with component material 78 when component material 78 in the molten state is introduced into mold 1000 (shown in FIG. 10). In alternative embodiments, component material 78 is any suitable alloy, and jacket material 778 is at least one material that is compatible with the molten alloy. For example, component material 78 is a cobalt-based superalloy, and jacket material 778 is substantially cobalt.

For another example, component material 78 is an iron-based alloy, and jacket material 778 is substantially iron. For another example, component material 78 is a titanium-based alloy, and jacket material 778 is substantially titanium.

In certain embodiments, thickness 706 is sufficiently thin such that jacket material 778 is substantially absorbed by component material 78 when component material 78 in the molten state is introduced into mold 1000. For example, in some such embodiments, jacket material 778 is substantially absorbed by component material 78 such that no discrete boundary delineates jacket material 778 from component material 78 after component material 78 is cooled. Moreover, in some such embodiments, jacket 700 is substantially absorbed such that, after component material 78 is cooled, jacket material 778 is substantially uniformly distributed within component material 78. For example, a concentration of jacket material 778 proximate core 800 (shown in FIG. 8) is not detectably higher than a concentration of jacket material 778 at other locations within component 80. For example, and without limitation, jacket material 778 is nickel and component material 78 is a nickel-based superalloy, and no detectable higher nickel concentration remains proximate core 800 after component material 78 is cooled, resulting in a distribution of nickel that is substantially uniform throughout the nickel-based superalloy of formed component 80.

In alternative embodiments, thickness 706 is selected such that jacket material 778 is other than substantially absorbed by component material 78. For example, in some embodiments, jacket material 778 is partially absorbed by component material 78, such that after component material 78 is cooled, jacket material 778 is other than substantially uniformly distributed within component material 78. For example, a concentration of jacket material 778 proximate core 800 is detectably higher than a concentration of jacket material 778 at other locations within component 80. In some such embodiments, jacket material 778 is insubstantially absorbed, that is, at most only slightly absorbed, by component material 78 such that a discrete boundary delineates jacket material 778 from component material 78 after component material 78 is cooled. Additionally or alternatively, in some such embodiments, jacket material 778 is insubstantially absorbed, that is, at most only slightly absorbed, by component material 78 such that at least a portion of jacket 700 proximate core 800 remains intact after component material 78 is cooled.

In some embodiments, jacket 700 is formed on at least a portion of the surface of precursor component 580 by a plating process, such that jacket material 778 is deposited on precursor component 580 until the selected thickness 706 of jacket 700 is achieved. For example, jacket material 778 is a metal, and is deposited on precursor component 580 in a suitable metal plating process. In some such embodiments, jacket material 778 is deposited on precursor component 580 in an electroless plating process. Additionally or alternatively, jacket material 778 is deposited on precursor component 580 in an electroplating process. In alternative embodiments, jacket material 778 is any suitable material, and jacket 700 is formed on precursor component 580 by any suitable plating process that enables jacket 700 to function as described herein.

In certain embodiments, jacket material 778 includes a plurality of materials disposed on precursor component 580 in successive layers. For example, precursor material 578 is a thermoplastic, an initial layer of jacket material 778 is a first metal alloy selected to facilitate electroless plating deposition onto precursor material 578, and a subsequent layer of jacket material 778 is a second metal alloy selected to facilitate electroplating to the prior layer of jacket material 778. In some such embodiments, each of the first and second metal alloys are alloys of nickel. In other embodiments, precursor material 578 is any suitable material, jacket material 778 is any suitable plurality of materials, and jacket 700 is formed on precursor component 580 by any suitable process that enables jacket 700 to function as described herein.

In the exemplary embodiment shown in FIG. 7, jacket 700 is not adjacent exterior surface 592 of outer wall 594 of precursor component 580. Similarly, in the exemplary embodiment shown in FIG. 19, jacket 700 is not adjacent second surface 593 of outer wall 594 of precursor component 580. In some embodiments, a masking material is applied to exterior surface 592 or second surface 593, respectively, prior to a plating process to inhibit deposition of jacket material 778 thereon. In alternative embodiments, application of jacket material 778 to exterior surface 592 or second surface 593, respectively, is inhibited using any suitable method. In other alternative embodiments, application of jacket material 778 to exterior surface 592 or second surface 593, respectively, is not inhibited. For example, but not by way of limitation, jacket material 778 is applied to both of exterior surface 592 and second surface 593 during a bulk plating process of precursor component 580, and is subsequently removed from exterior surface 592 or second surface 593, respectively, in any suitable fashion.

Figure 13:
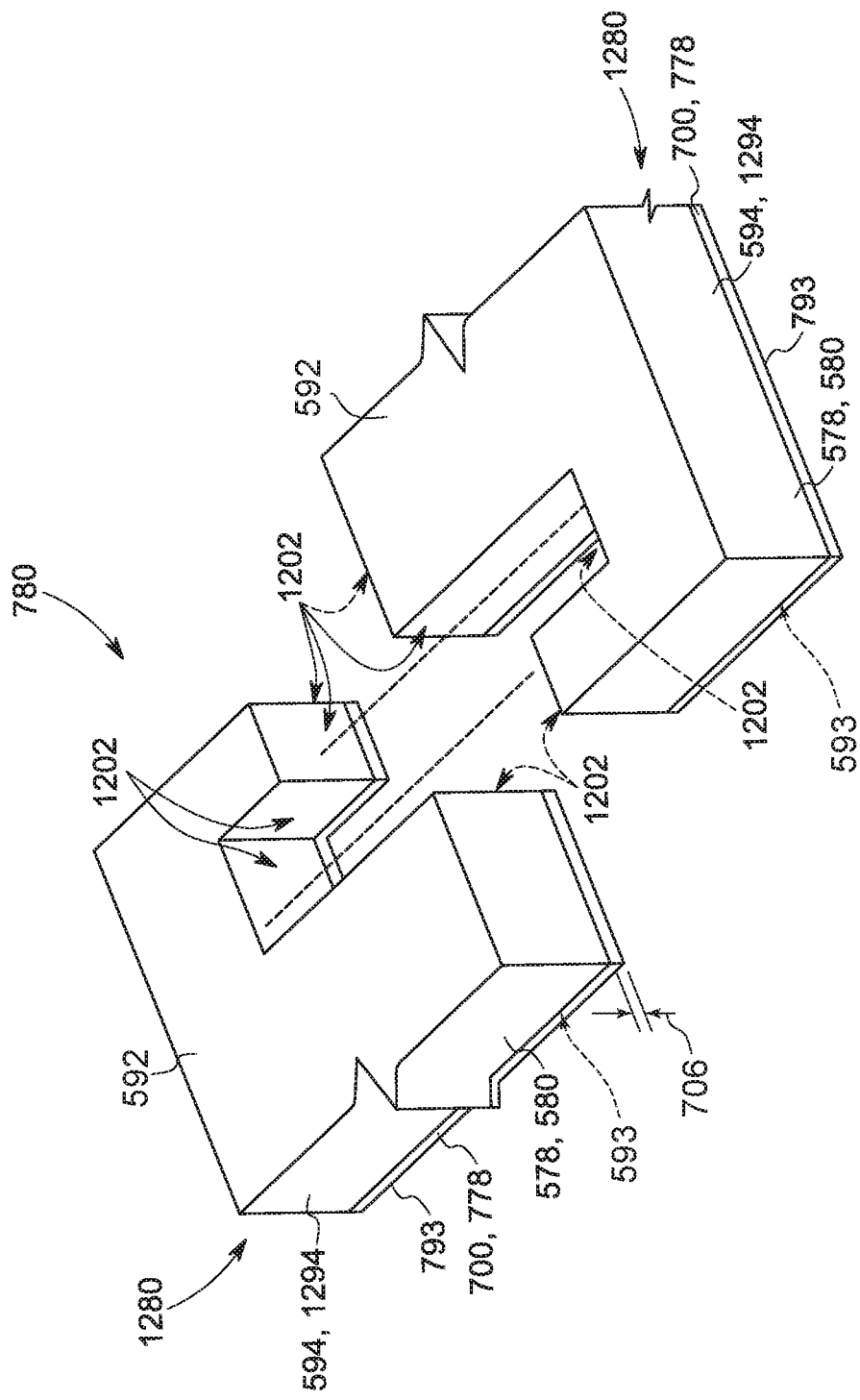
FIG. 13 is a schematic perspective exploded view of a portion of another exemplary jacketed precursor component that may be used to form the component shown in FIG. 2.
Figure 14:
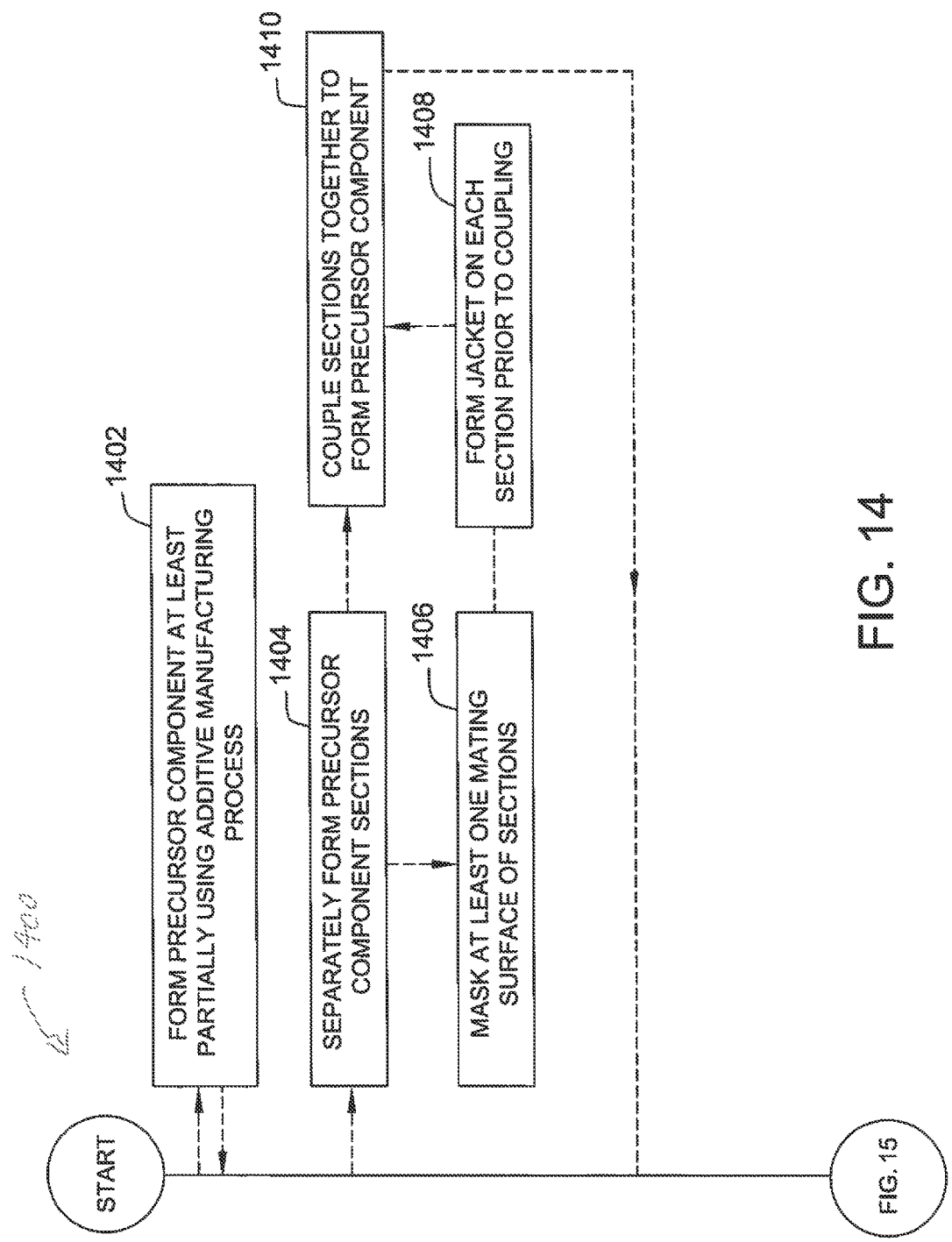
FIG. 14 is a flow diagram of an exemplary method of forming a component having an outer wall of a predetermined thickness, such as the exemplary component shown in FIG. 2.
Figure 15:
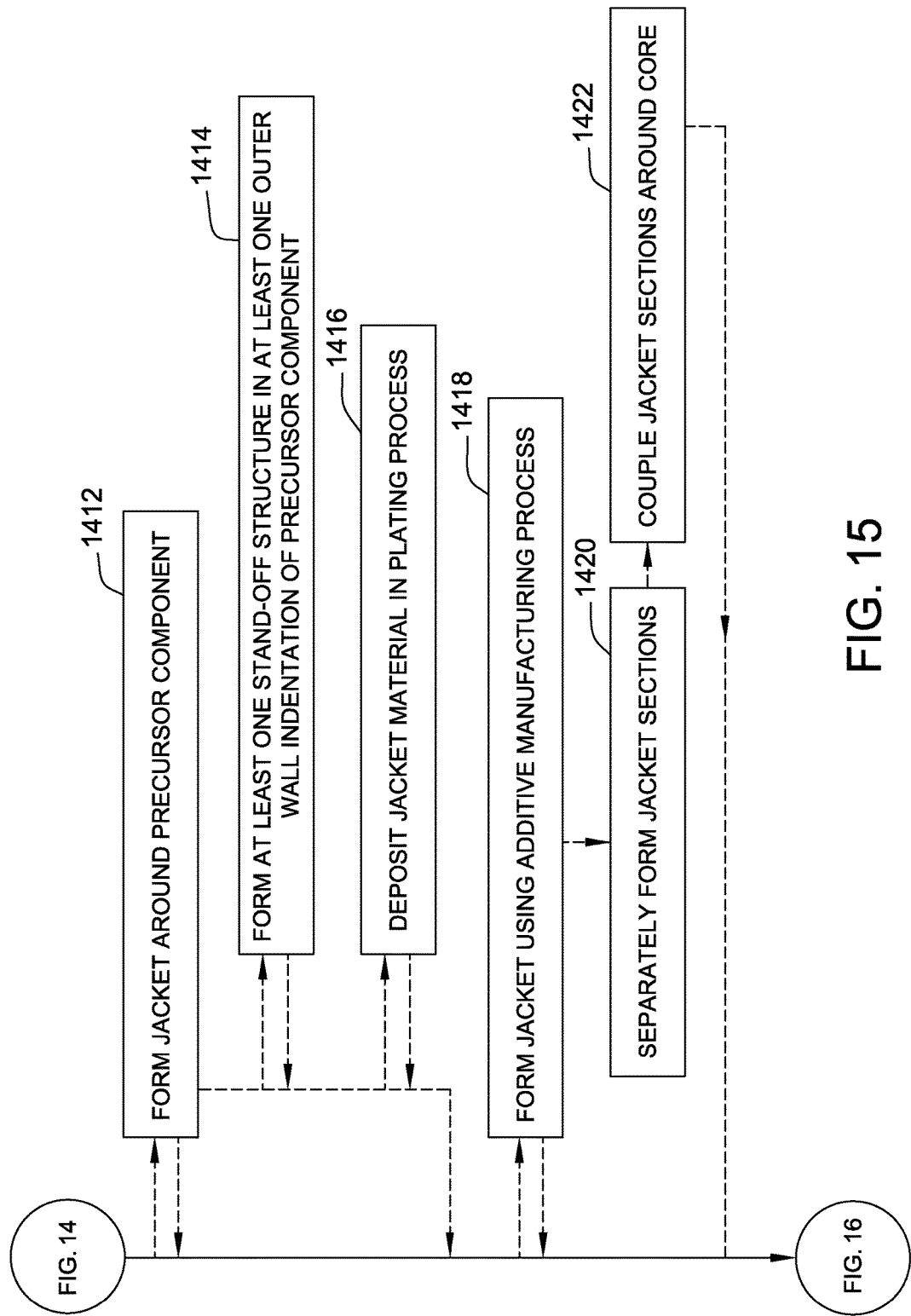
FIG. 15 is a continuation of the flow diagram of FIG. 14.
Figure 16:
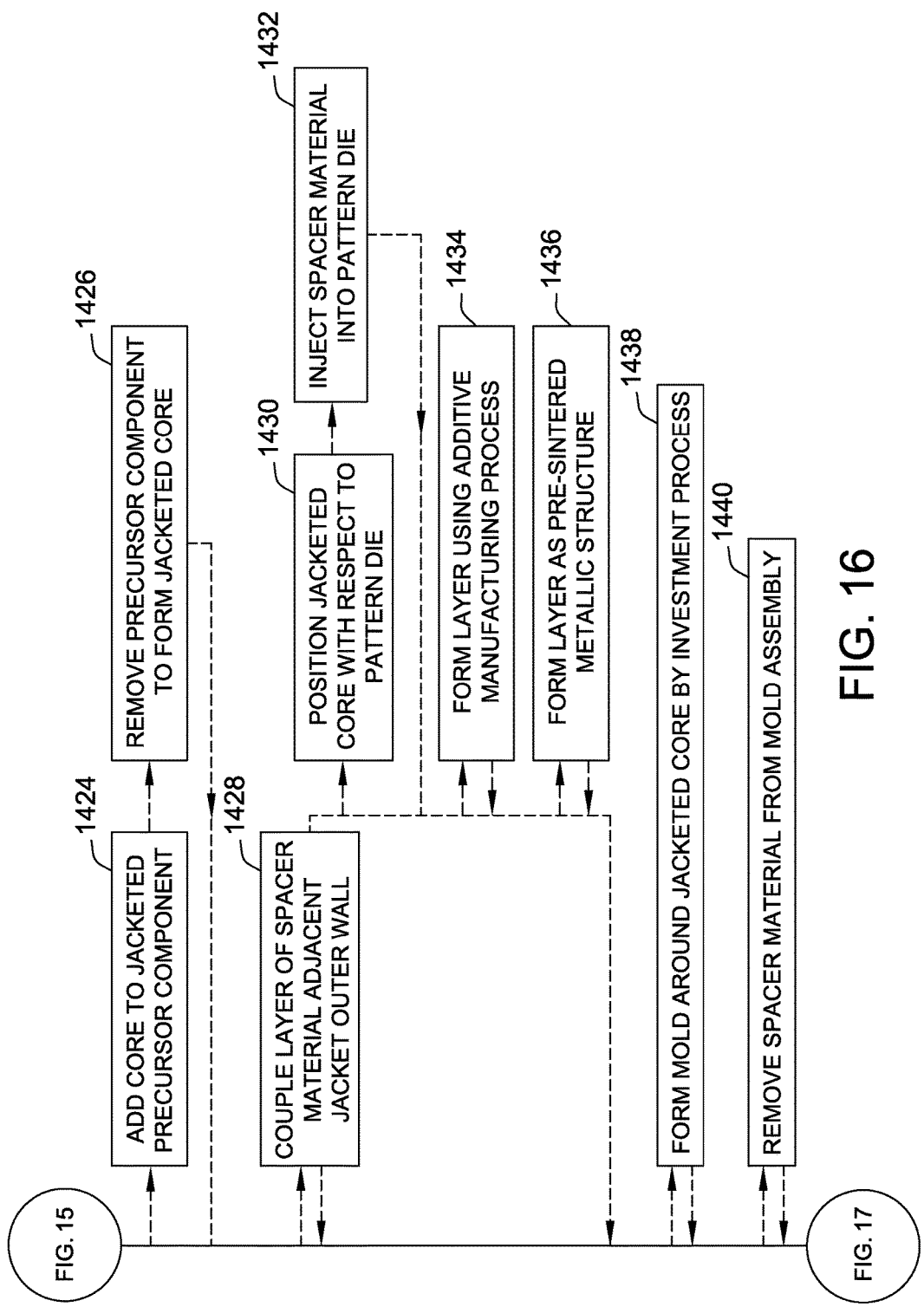
FIG. 16 is a continuation of the flow diagram of FIGS. 14 and 15.
Figure 17:
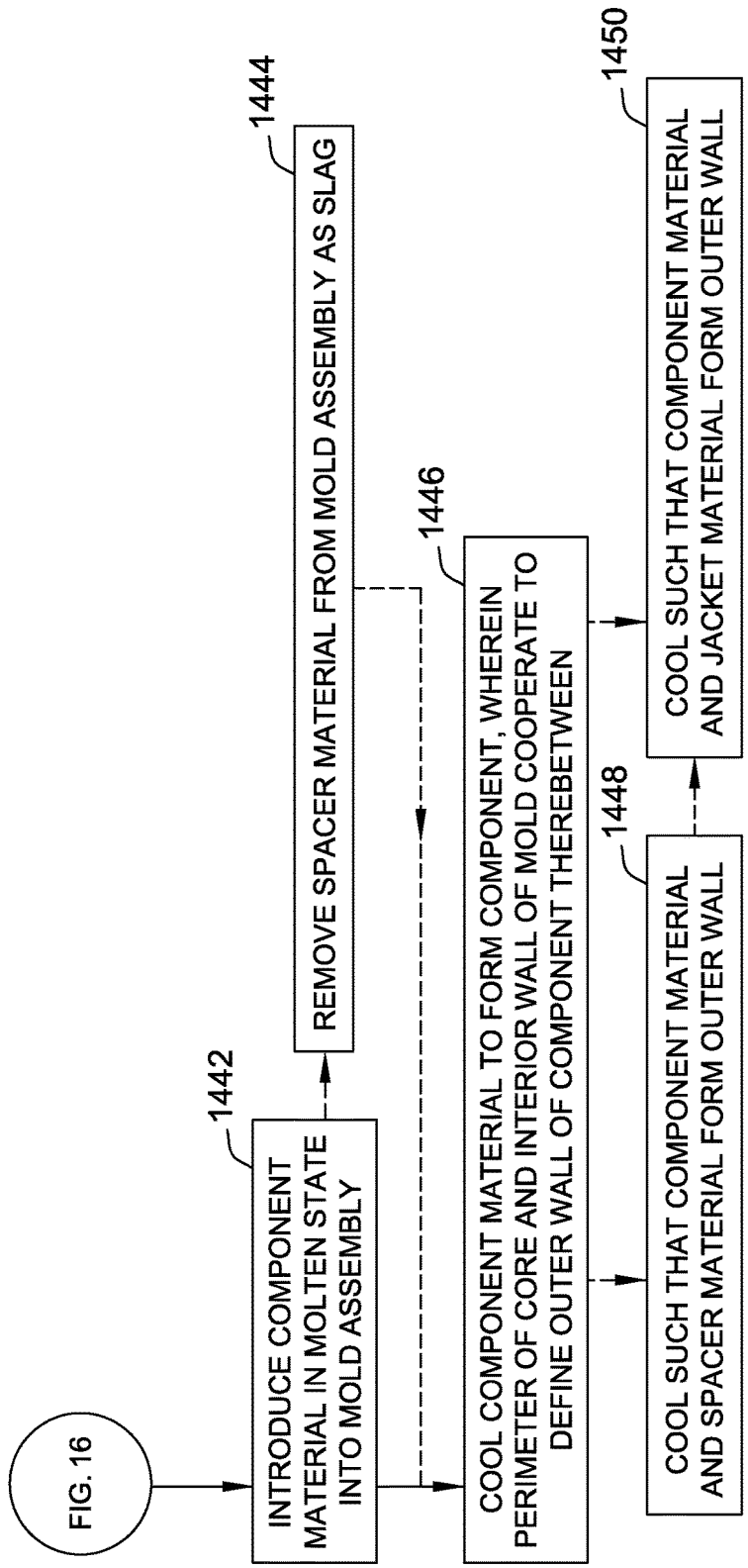
FIG. 17 is a continuation of the flow diagram of FIGS. 14-16.

In certain embodiments, jacketed precursor component 780 is formed from a unitary precursor component 580. In alternative embodiments, jacketed precursor component 780 is formed from a precursor component 580 that is other than unitarily formed. For example, FIG. 13 is a schematic perspective exploded view of a portion of another exemplary jacketed precursor component 780 that may be used to form component 80 shown in FIG. 2. In the illustrated embodiment, jacketed precursor component 780 includes precursor component 580 formed from a plurality of separately formed sections 1280 coupled together.

More specifically, in the illustrated embodiment, each precursor component section 1280 includes an outer wall section 1294, and the plurality of outer wall sections 1294 are configured to couple together at a plurality of mating surfaces 1202 to form precursor component outer wall 594. In the illustrated embodiment, jacket material 778 is positioned adjacent second surface 593 of each outer wall section 1294 to form outer wall 793 of jacket 700. It should be understood that in alternative embodiments, jacket material 778 is positioned adjacent exterior surface 592 of each outer wall section 1294 to form outer wall 793 of jacket 700, as described above.

In certain embodiments, jacket material 778 is not applied to mating surfaces 1202. For example, in some embodiments, jacket material 778 is applied to each precursor component section 1280 in a plating process as described above, and a masking material is first applied to each mating surface 1202, in addition to exterior surface 592, to inhibit deposition of jacket material 778 on mating surfaces 1202. In alternative embodiments, application of jacket material 778 to mating surfaces 1202 is inhibited using any suitable method. Moreover, in some embodiments, application of jacket material 778 is similarly inhibited on other selected surfaces of precursor component 580 in addition to, or alternatively from, mating surfaces 1202.

In some embodiments, but not by way of limitation, formation of precursor component 580 and jacketed precursor component 780 from a plurality of separately formed and jacketed precursor component sections 1280 facilitates precise and/or repeatable application of jacket 700 to selected areas of precursor components 580 that have a relatively increased structural complexity. As one example, in some embodiments, one of internal voids 500 (shown in FIG. 7) defines an internal pipe bounded by specified portions of precursor component inner wall 596 and/or partition walls 595. The internal pipe extends to a depth within precursor component 580 for which a selected plating process would not be effective to reliably deposit jacket 700 on the specified portions of precursor component inner wall 596 and/or partition walls 595 of a unitary precursor component 580. Instead, precursor component 580 includes a pair of separately formed "half-pipe" sections such that the specified portions of precursor component inner wall 596 and/or partition walls 595 are exposed along their full depth, and each half-pipe section is separately plated with jacket 700 prior to coupling the sections together to form jacketed precursor component 780. Furthermore, in some such embodiments, masking of mating surfaces 1202 during application of jacket material 778 facilitates coupling together jacketed precursor component sections 1280. In alternative embodiments, jacket 700 is formed on the assembled precursor component 580 subsequent to coupling together of the sections of precursor component 580.

In certain embodiments, after pre-jacketed sections 1280 are coupled together, and/or unjacketed sections 1280 are coupled together and jacket 700 is applied to the coupled-together sections, to form jacketed precursor component 780, jacketed cored precursor component 880 (shown in FIG. 8) is formed by filling the at least one internal void 500 of jacketed precursor component 780 with a core material 878 and firing to cure core 800, as described below. In alternative embodiments, core 800 is formed from core material 878 and fired in a separate core-forming process, and jacketed sections 1280 are coupled around core 800 to form jacketed cored precursor component 880.

Returning to FIGS. 7 and 19, in alternative embodiments, jacket 700 is formed in any suitable fashion. For example, jacket 700 is formed using a process that does not involve precursor component 580. In some such embodiments, jacket 700 is formed at least partially using a suitable additive manufacturing process, and jacket material 778 is selected to facilitate additive manufacture of jacket 700. For example, a computer design model of jacket 700 is developed from a computer design model of component 80, with preselected thickness 706 of jacket 700 added in the computer design model adjacent selected surfaces of component 80 and stand-off structures 720 added within outer wall 94, as described above, and then component 80 itself is removed from the computer design model. The computer design model for jacket 700 is sliced into a series of thin, parallel planes, and a computer numerically controlled (CNC) machine deposits successive layers of jacket material 778 from a first end to a second end of jacket 700 in accordance with the model slices to form jacket 700. In some embodiments, the successive layers of jacket material 778 are deposited using at least one of a direct metal laser melting (DMLM) process, a direct metal laser sintering (DMLS) process, and a selective laser sintering (SLS) process. Additionally or alternatively, jacket 700 is formed using another suitable additive manufacturing process. It should be understood that in certain embodiments, jacket 700 is formed from a plurality of separately additively manufactured sections that are subsequently coupled together, such as around a separately formed core 800, in any suitable fashion.

In certain embodiments, the formation of jacket 700 by an additive manufacturing process enables jacket 700 to be formed with a nonlinearity, structural intricacy, precision, and/or repeatability that is not achievable by other methods. Accordingly, the formation of jacket 700 by an additive manufacturing process enables the complementary formation of core 800 (shown in FIG. 8), and thus of component 80, with a correspondingly increased nonlinearity, structural intricacy, precision, and/or repeatability. Additionally or alternatively, the formation of jacket 700 using an additive manufacturing process enables the formation of internal voids 500 that could not be reliably added to component 80 in a separate process after initial formation of component 80 in a mold. Moreover, in some embodiments, the formation of jacket 700 by an additive manufacturing process decreases a cost and/or a time required for manufacture of component 80, as compared to forming component 80 directly by additive manufacture using component material 78.

Figure 8:
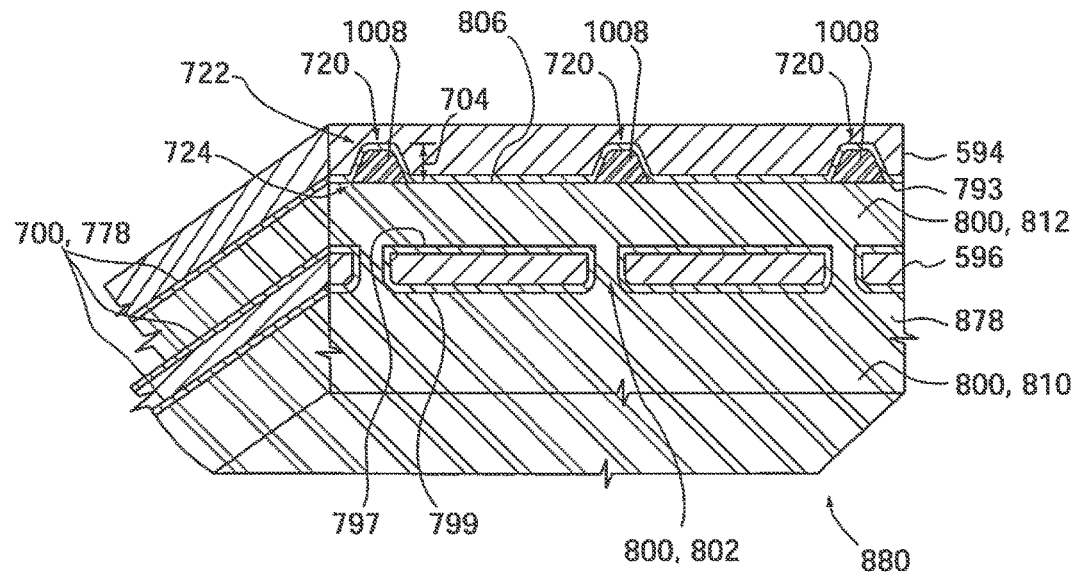
FIG. 8 is a schematic perspective sectional view of a portion of an exemplary jacketed cored precursor component that includes an exemplary core within the jacketed precursor component shown in FIG. 7.

FIG. 8 is a schematic perspective sectional view of a portion of an exemplary jacketed cored precursor component 880 that includes exemplary core 800 within the embodiment of jacketed precursor component 780 shown in FIG. 7. FIG. 20 is a schematic perspective sectional view of a portion of another exemplary jacketed cored precursor component 880 that includes exemplary core 800 within the embodiment of jacketed precursor component 780 shown in FIG. 19. With reference to FIGS. 8 and 20, core 800 is positioned interiorly of jacket outer wall 793, such that perimeter 806 of core 800 is coupled against one of first ends 722 and second ends 724 of stand-off structures 720 of jacket outer wall 793. More specifically, in the embodiment shown in FIG. 8, core perimeter 806 is coupled against second ends 724 of stand-off structures 720, as well as against portions of jacket outer wall 793 that extend between stand-off structures 720, and in the embodiment shown in FIG. 20, core perimeter 806 is coupled against first ends 722 of stand-off structures 720.

In addition, core 800 is located within the at least one internal void 500 of jacketed precursor component 780. For example, in the exemplary embodiment, core 800 includes at least one plenum core portion 810, at least one chamber core portion 812, and at least one return channel core portion 814 (shown in FIG. 11) positioned respectively in the at least one plenum 510, the at least one chamber 512, and the at least one return channel 514 of jacketed precursor component 780. The at least one plenum core portion 810, the at least one chamber core portion 812, and the at least one return channel core portion 814 are configured to define, respectively, the at least one plenum 110, the at least one chamber 112, and the at least one return channel 114 when component 80 is formed. Further in the exemplary embodiment, core 800 includes inner wall aperture core portions 802 positioned in inner wall apertures 502 of jacketed precursor component 780, and inner wall aperture core portions 802 are configured to define inner wall apertures 102 when component 80 is formed. In alternative embodiments, inner wall 596 does not include inner wall apertures 502, and core 800 correspondingly does not include core portions 802. For example, as described above, component 80 is initially formed without inner wall apertures 102, and inner wall apertures 102 are added to component 80 in a subsequent process.

Core 800 is formed from a core material 878. In the exemplary embodiment, core material 878 is a refractory ceramic material selected to withstand a high temperature environment associated with the molten state of component material 78 used to form component 80. For example, but without limitation, core material 878 includes at least one of silica, alumina, and mullite. Moreover, in the exemplary embodiment, core material 878 is selectively removable from component 80 to form the at least one internal void 100. For example, but not by way of limitation, core material 878 is removable from component 80 by a suitable process that does not substantially degrade component material 78, such as, but not limited to, a suitable chemical leaching process. In certain embodiments, core material 878 is selected based on a compatibility with, and/or a removability from, component material 78. Additionally or alternatively, core material 878 is selected based on a compatibility with jacket material 778. For example, in some such embodiments, core material 878 is selected to have a matched thermal expansion coefficient to that of jacket material 778, such that during core firing, core 800 and jacket 700 expand at the same rate, thereby reducing or eliminating stresses, cracking, and/or other damaging of the core due to mismatched thermal expansion. In alternative embodiments, core material 878 is any suitable material that enables component 80 to be formed as described herein.

In some embodiments, jacketed cored precursor component 880 is formed by filling the at least one internal void 500 of jacketed precursor component 780 with core material 878. For example, but not by way of limitation, core material 878 is injected as a slurry into plenums 510, chambers 512, inner wall apertures 502, and return channels 514, and core material 878 is then dried and fired within jacketed precursor component 780 to form core 800. In alternative embodiments, an alternative refractory material, such as but not limited to a segment of a quartz rod (not shown), is inserted into inner wall apertures 502 prior to injection of core material 878, and the alternative refractory material forms core portions 802. In certain embodiments, use of the alternative refractory material to form core portions 802 avoids a risk of cracking of core material 878 in a small-hole geometry of portions 802.

In certain embodiments in which jacket outer wall 793 is positioned adjacent second surface 593 of precursor component 580, as shown in FIG. 8, a filler material 1008 is positioned within each stand-off structure 720 prior to formation of core 800 within jacketed cored precursor component 880. More specifically, filler material 1008 is inserted into each stand-off structure 720 flush with jacket outer wall 793 such that a shape of jacket outer wall 793 with filler material 1008 added corresponds to the shape of second surface 93 of component outer wall 94 proximate stand-off structures 720. For example, but not by way of limitation, filler material 1008 is a wax material. In some such embodiments, filler material 1008 is removed from mold 1000 as slag after molten component material 78 is introduced into mold 1000. For another example, but not by way of limitation, filler material 1008 is selected to at least partially form component outer wall 94 after molten component material 78 is introduced to mold 1000. For example, filler material 1008 is selected to be at least one of component material 78, at least one component of an alloy that constitutes component material 78, at least partially absorbable by molten component material 78, and another material suitably compatible with component material 78, as described above with respect to jacket material 778. In certain embodiments, filler material 1008 facilitates preventing stand-off structures 720 from forming core protrusions on core perimeter 806 that would form corresponding indentations in component outer wall 94 when component 80 is formed in mold 1000. In alternative embodiments, filler material 1008 is not used. For example, but not by way of limitation, in some such embodiments in which outer wall 94 includes openings extending therethrough, as described above, filler material 1008 is not present, enabling core material 878 to flow into stand-off structures 720 to define the openings through outer wall 594.

In certain embodiments in which jacket outer wall 793 is positioned adjacent exterior surface 592 of precursor component 580, as shown in FIG. 20, closures 723 at first end 722 of stand-off structures 720 facilitates preventing stand-off structures 720 from forming core protrusions on core perimeter 806 that would form corresponding indentations in component outer wall 94 when component 80 is formed in mold 1000. In alternative embodiments, closures 723 are not formed. For example, but not by way of limitation, in some such embodiments in which outer wall 94 includes openings extending therethrough, as described above, an absence of closures 723 at first end 722 enables core material 878 to flow into stand-off structures 720 to define the openings through outer wall 594.

In alternative embodiments, core 800 is formed and positioned in any suitable fashion that enables core 800 to function as described herein. For example, but not by way of limitation, core material 878 is injected as a slurry into a suitable core die (not shown), dried, and fired in a separate core-forming process to form core 800. In some such embodiments, for example, sections of jacketed precursor component 580 are coupled around the separately formed core 800 to form jacketed cored precursor component 880. In other such embodiments, for example, sections of jacket 700 are decoupled from, or formed without using, precursor component 580, and the sections of jacket 700 are coupled around the separately formed core 800 to form jacketed core 980. In still other embodiments, for example, jacket 700 is decoupled from, or formed without using, precursor component 580, and core material 878 is added as a slurry to jacket 700 and fired within jacket 700 to form core 800 within jacketed core 980.

Figure 9:
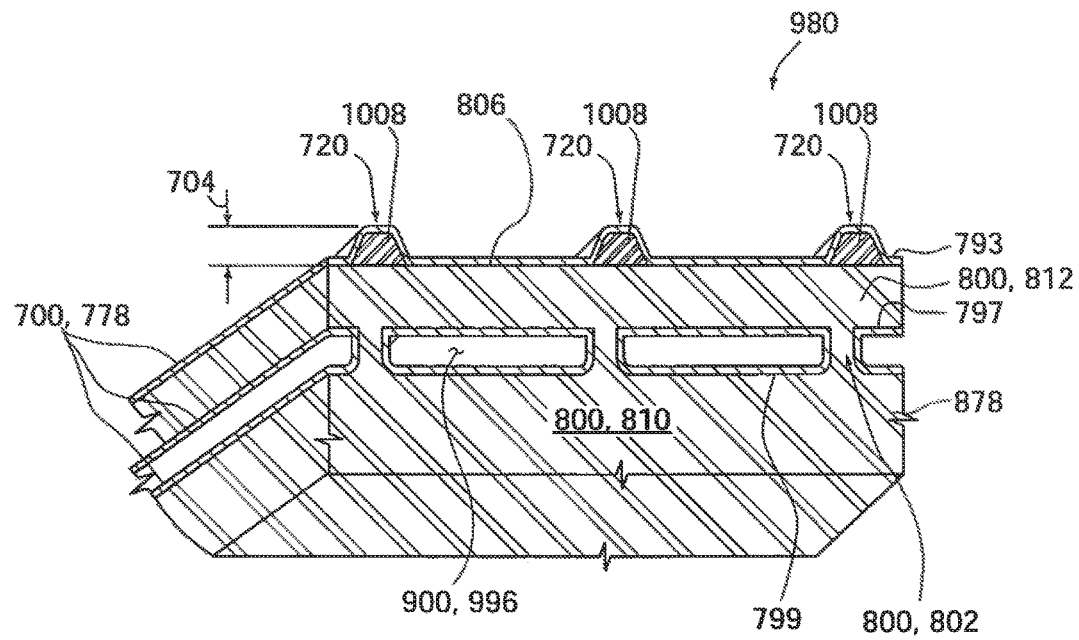
FIG. 9 is a schematic perspective sectional view of a portion of an exemplary jacketed core that includes portions of the exemplary jacketed cored precursor component shown in FIG. 8 other than the precursor component shown in FIG. 5.

FIG. 9 is a schematic perspective sectional view of a portion of an exemplary jacketed core 980 that includes portions, other than precursor component 580, of the exemplary jacketed cored precursor component 880 shown in FIG. 8. FIG. 21 is a schematic perspective sectional view of a portion of another exemplary jacketed core 980 that includes portions, other than precursor component 580, of the exemplary jacketed cored precursor component 880 shown in FIG. 20.

With reference to FIGS. 9 and 21, in certain embodiments, jacketed core 980 is formed by removing precursor component 580 from jacketed cored precursor component 880, for example by oxidizing or "burning out" precursor material 578 from jacketed cored precursor component 880. For example, in the exemplary embodiment, precursor component outer wall 594, precursor component inner wall 596, and precursor partition walls 595 are removed from jacketed cored precursor component 880 to form jacketed core 980. In alternative embodiments, jacketed core 980 is formed from jacket 700 that is first decoupled from, or formed without using, precursor component 580, as described above.

In the exemplary embodiment, jacket outer wall 793 including the at least one stand-off structure 720 defines an outer perimeter of jacketed core 980. As discussed above, jacket 700 is configured to separate core perimeter 806 from interior wall 1002 of mold 1000 by thickness 104 of component outer wall 94 (shown in FIG. 4). For example, in the exemplary embodiments of FIGS. 9 and 21, stand-off structures 720 have sufficient stiffness such that combined thickness 704 of each stand-off structure 720 corresponds to thickness 104 of component outer wall 94. In alternative embodiments, jacket 700 is configured in any other suitable fashion to separate core perimeter 806 from interior wall 1002 of mold 1000 by thickness 104 of component outer wall 94.

In some embodiments, jacketed core 980 defines at least one jacketed cavity 900 therewithin. Each at least one jacketed cavity 900 is configured to receive molten component material 78 therein to form a corresponding portion of component 80. More specifically, molten component material 78 is added to the at least one jacketed cavity 900 and cooled, such that component material 78 and jacket material 778 bounded by core 800 and/or interior wall 1002 at least partially define the corresponding portion of component 80, as will be described herein.

For example, in the exemplary embodiment of FIG. 21, core perimeter 806 and jacket outer wall 793 cooperate to define at least one outer wall jacketed cavity 994 therebetween. A shape of the at least one outer wall jacketed cavity 994 corresponds to a shape of outer wall 94 of component 80 at locations other than proximate stand-off structures 720.

For another example, in the exemplary embodiments of FIGS. 9 and 21, opposing jacket inner walls 797 and 799 define at least one inner wall jacketed cavity 996 therebetween. Because jacket inner walls 797 and 799 define a shape that corresponds to a shape of inner wall 96 of component 80, a shape of plenum core portion 810 around the boundary of the at least one inner wall jacketed cavity 996 corresponds to a shape of inner wall 96 of component 80. Moreover, in some embodiments, the opposing jacket partition walls corresponding to component partition walls 95 define at least one partition wall jacketed cavity (not shown) therebetween.

In alternative embodiments, jacketed core 980 defines the at least one jacketed cavity 900 having a shape corresponding to any suitable portion of component 80 for use in any suitable application. In other alternative embodiments, jacketed core 980 does not define the at least one jacketed cavity 900.

In certain embodiments, precursor material 578 is selected to facilitate removal of precursor component 580 from within jacketed cored precursor component 880 to form jacketed core 980. In some such embodiments, precursor material 578 is selected to have an oxidation or auto-ignition temperature that is less than a melting point of jacket material 778. For example, a temperature of jacketed precursor component 780 is raised to or above the oxidation temperature of precursor material 578, such that precursor component 580 is oxidized or burned out of jacket 700. Moreover, in some such embodiments, precursor component 580 is oxidized at least partially simultaneously with a firing of core 800 within jacketed cored precursor component 880. Alternatively, precursor material 578 is oxidized and/or otherwise removed at least partially simultaneously with, or subsequent to, firing of mold 1000 (shown in FIG. 11) around jacketed cored precursor component 880. Alternatively, precursor material 578 is oxidized and/or otherwise removed prior to firing core 800 within jacketed cored precursor component 880. Additionally or alternatively, precursor material 578 is melted and drained from within jacketed cored precursor component 880.

Additionally or alternatively, precursor material 578 is selected to be a softer material than jacket material 778, and precursor component 580 is machined out of jacketed cored precursor component 880. For example, a mechanical rooter device is snaked into jacket 700 to break up and/or dislodge precursor material 578 to facilitate removal of precursor component 580. Additionally or alternatively, precursor material 578 is selected to be compatible with a chemical removal process, and precursor component 580 is removed from jacket 700 using a suitable solvent.

Figure 11:
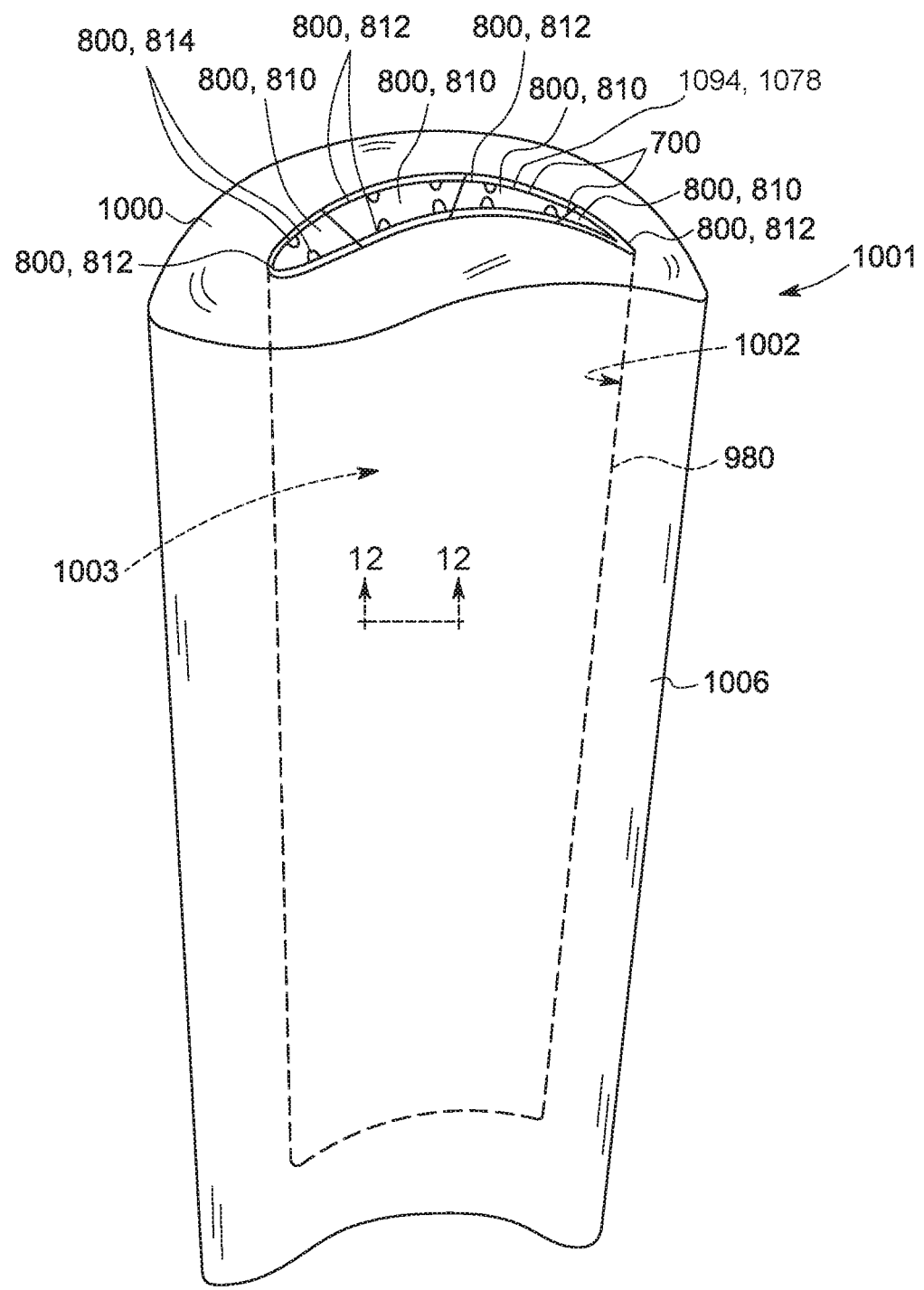
FIG. 11 is a schematic perspective view of an exemplary mold assembly that includes the exemplary jacketed core shown in FIGS. 9 and 10 and that may be used to form the exemplary component shown in FIGS. 2-4.

In alternative embodiments, precursor material 578 is any suitable material that enables precursor component 580 to be removed from within jacketed cored precursor component 880 in any suitable fashion at any suitable point in the process of forming mold assembly 1001 (shown in FIG. 11). In other alternative embodiments, jacket 700 is formed by a process that does not include any use of precursor component 580, as described above, such that no precursor material 578 needs to be removed to form jacketed core 980.

In the exemplary embodiment, core 800 includes, as described above, the at least one plenum core portion 810 positioned interiorly from second jacket inner wall 799, the at least one chamber core portion 812 positioned between first jacket inner wall 797 and second jacket outer wall 793, and inner wall aperture core portions 802 extending through the at least one inner wall jacketed cavity 996. In some embodiments, core 800 also includes the at least one return channel core portion 814 (shown in FIG. 11). In certain embodiments, jacket 700 provides a skeleton structure within jacketed core 980 that facilitates positioning the plurality of portions of core 800 with respect to each other and, subsequently, with respect to mold 1000 (shown in FIG. 10).

In alternative embodiments, core 800 is configured to correspond to any other suitable configuration of the at least one internal void 100 that enables component 80 to function for its intended purpose.

In certain embodiments, jacket 700 structurally reinforces core 800, thus reducing potential problems that would be associated with production, handling, and use of an unreinforced core 800 to form component 80 in some embodiments. For example, in certain embodiments, core 800 is a relatively brittle ceramic material subject to a relatively high risk of fracture, cracking, and/or other damage. Thus, in some such embodiments, forming and transporting jacketed core 980 presents a much lower risk of damage to core 800, as compared to using an unjacketed core 800. Similarly, in some such embodiments, forming a suitable mold 1000 (shown in FIG. 10) around jacketed core 980, such as by repeated investment of jacketed core 980 in a slurry of mold material, presents a much lower risk of damage to jacketed core 980, as compared to using an unjacketed core 800. Thus, in certain embodiments, use of jacketed core 980 presents a much lower risk of failure to produce an acceptable component 80, as compared to forming component 80 using an unjacketed core 800.

FIG. 10 is a schematic perspective sectional view of an exemplary spacer material 1078 coupled adjacent outer wall 793 of the embodiment of jacketed core 980 shown in FIG. 9. More specifically, a layer 1094 of spacer material 1078 adjacent jacket outer wall 793 is shaped to correspond to a shape of exterior surface 92 of component 80, such that interior wall 1002 of mold 1000 (shown in FIG. 12) formed around jacketed core 980 and layer 1094 has a shape complementary to exterior surface 92. In the exemplary embodiment, layer 1094 has a thickness 1084 corresponding to combined thickness 704 from first end 722 to second end 724 of stand-off structures 720, less thickness 706 of jacket 700, such that layer 1094 is flush with first end 722 of each stand-off structure 720.

In certain embodiments, spacer material 1078 is coupled adjacent outer wall 793 of jacketed core 980 in a suitable die cast process. For example, a pattern die (not shown) is formed having an interior wall shape complementary to the shape of exterior surface 92 of component 80, jacketed core 980 is positioned with respect to the pattern die such that first end 722 of each stand-off structure 720 is coupled against the interior wall, and spacer material 1078 is injected into the pattern die such that layer 1094 is formed adjacent jacket outer wall 793. For example, but not by way of limitation, spacer material 1078 is a wax material. Jacketed core 980 having layer 1094 coupled thereto is removed from the pattern die.

In other embodiments, layer 1094 is formed separately and subsequently coupled to jacket outer wall 793 of jacketed core 980. For example, but not by way of limitation, layer 1094 is formed using a suitable additive manufacturing process. A computer design model of layer 1094 is developed from a computer design model of outer wall 94 of component 80, modified to account for the shapes of stand-off structures 720 and jacket outer wall 793. The computer design model for layer 1094 is sliced into a series of thin, parallel planes, and a computer numerically controlled (CNC) machine deposits successive layers of spacer material 1078 from the first end to the second end in accordance with the model slices to form layer 1094.

In some such embodiments, spacer material 1078 is selected to facilitate additive manufacture of layer 1094 and to be removable from mold 1000 prior to or after introduction of molten component material 78 in mold 1000. For example, spacer material 1078 is selected to be a photopolymer, and the successive layers of spacer material 1078 are deposited using a stereolithographic process. Alternatively, spacer material 1078 is selected to be a thermoplastic, and the successive layers of spacer material 1078 are deposited using at least one of a fused filament fabrication process, an inkjet/powder bed process, a selective heat sintering process, and a selective laser sintering process. Additionally or alternatively, spacer material 1078 is selected to be any suitable material, and the successive layers of spacer material 1078 are deposited using any suitable process that enables layer 1094 to be formed as described herein. It should be understood that in certain embodiments, layer 1094 is formed from a plurality of separately manufactured sections that are subsequently coupled to jacketed core 980 in any suitable fashion. In certain embodiments, spacer material 1078 is oxidized or "burned out" of, or alternatively melted and drained from, mold 1000 prior to introduction of molten component material 78 within mold 1000. In other embodiments, spacer material 1078 is removed from mold 1000 as slag after molten component material 78 is introduced into mold 1000. In alternative embodiments, spacer material 1078 is removed from mold 1000 in any suitable fashion that enables mold 1000 to function as described herein.

In other embodiments, spacer material 1078 is selected to at least partially form component outer wall 94 after molten component material 78 is introduced to mold 1000. For example, spacer material 1078 is selected to be at least one of component material 78, at least one component of an alloy that constitutes component material 78, at least partially absorbable by molten component material 78, and another material suitably compatible with component material 78, as described above with respect to jacket material 778. In some such embodiments, layer 1094 is formed as a low density metallic structure, rather than as a solid metal layer. For example, but not by way of limitation, layer 1094 is formed as a pre-sintered structure using a suitable powdered metallurgy process. Additionally or alternatively, in some such embodiments, layer 1094 is at least partially formed from a suitable additive manufacturing process using a computer design model for layer 1094 as described above. For example, the successive layers of spacer material 1078 are deposited using at least one of a direct metal laser melting (DMLM) process, a direct metal laser sintering (DMLS) process, and a selective laser sintering (SLS) process. Again, it should be understood that in certain embodiments, layer 1094 is formed from a plurality of separately formed sections that are subsequently coupled to jacketed core 980 in any suitable fashion. In certain embodiments, when molten component material 78 is added to mold 1000, layer 1094 is one of substantially absorbed by molten component material 78, at least partially absorbed by molten component material 78, and at most insubstantially absorbed by molten component material 78, as described above with respect to jacket material 778.

Figure 12:
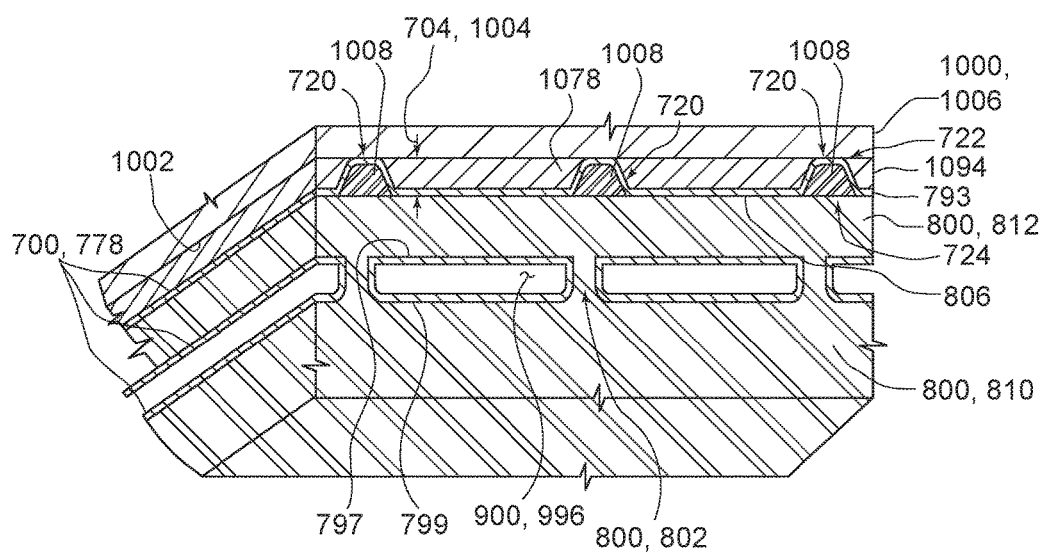
FIG. 12 is a schematic perspective sectional view of a portion of the mold assembly shown in FIG. 11, taken along lines 12-12 in FIG. 11, and including the portion of the exemplary jacketed core shown in FIG. 9.

FIG. 11 is a schematic perspective view of an exemplary mold assembly 1001 that includes the embodiment of jacketed core 980 shown in FIG. 9, and that may be used to form component 80 shown in FIGS. 2-4. FIG. 12 is a schematic perspective sectional view of a portion of mold assembly 1001, taken along lines 12-12 in FIG. 11, and including the portion of jacketed core 980 shown in FIGS. 9 and 10. FIG. 22 is a schematic perspective sectional view of a portion of another exemplary mold assembly 1001 that includes the embodiment of jacketed core 980 shown in FIG. 21, but otherwise is substantially identical to mold assembly 1001 shown in FIG. 11.

With reference to FIGS. 2-4, 11, 12, and 22, mold assembly 1001 includes jacketed core 980 positioned with respect to mold 1000. An interior wall 1002 of mold 1000 defines a mold cavity 1003 within mold 1000, and jacketed core 980 is at least partially received in mold cavity 1003. More specifically, interior wall 1002 defines a shape corresponding to an exterior shape of component 80, such that stand-off structures 720 are coupled against interior wall 1002. For example, in the embodiment of mold assembly 1001 shown in FIG. 12, first ends 722 of stand-off structures 720 are coupled against interior wall 1002, and layer 1094, which is shaped to correspond to the shape of component outer wall 94, is coupled against interior wall 1002 at locations other than proximate stand-off structures 720. For another example, in the embodiment of mold assembly 1001 shown in FIG. 22, jacket outer wall 793, which is shaped to correspond to the shape of component outer wall 94 in this embodiment, is coupled against interior wall 1002 at locations other than proximate stand-off structures 720, and a filler material 1009 having properties similar to filler material 1008 as described above is coupled against interior wall 1002 proximate stand-off structures 720.

In addition, jacket 700 separates core perimeter 806 from interior wall 1002 by thickness 104 of component outer wall 94, as discussed above, such that molten component material 78 is receivable between core perimeter 806 and mold interior wall 1002 to form component outer wall 94 having preselected thickness 104. More specifically, in the exemplary embodiment, the at least one stand-off structure 720 maintains combined thickness 704 from first end 722 to second end 724. Thus, when stand-off structures 720 are coupled against interior wall 1002, stand-off structures 720 position perimeter 806 of the at least one chamber core portion 812 with respect to interior wall 1002 at an offset distance 1004 that corresponds to combined thickness 704, which in turn corresponds to thickness 104 of outer wall 94 of component 80.

More specifically, the region defined between core perimeter 806 and interior wall 1002 is configured to receive molten component material 78, such that core perimeter 806 cooperates with interior wall 1002 of mold 1000 to define outer wall 94 of component 80 having thickness 104. Jacket material 778 of jacket outer wall 793 and component material 78, collectively bounded by core perimeter 806 and mold interior wall 1002, at least partially form outer wall 94. In some embodiments, for example, jacket material 778 of jacket outer wall 793 is substantially absorbed by molten component material 78 to form outer wall 94, while in other embodiments, for example, jacket outer wall 793 remains at least partially intact adjacent component material 78 within outer wall 94, as described above.

The embodiment of FIG. 12 illustrates a much greater proportion of jacket material 778 in jacket outer wall 793 positioned against core perimeter 806, as compared to a much smaller proportion of jacket material 778 in jacket outer wall 793 positioned against mold interior wall 1002. In contrast, the embodiment of FIG. 22 illustrates a much smaller proportion of jacket material 778 in jacket outer wall 793 positioned against core perimeter 806, as compared to a much greater proportion of jacket material 778 in jacket outer wall 793 positioned against mold interior wall 1002. In some applications in which jacket material 778 is only partially or insubstantially absorbed by molten component material 78 when component 80 is formed, a choice between embodiments similar to FIG. 12 and FIG. 22 is made corresponding to whether a user wishes to produce a lower concentration of jacket material 778 proximate exterior surface 92, or proximate the opposite second surface 93, when component 80 is formed in mold assembly 1001. Moreover, it should be understood that in alternative embodiments, at least one of a shape and distribution of stand-off structures 720 is selected to produce a more even distribution of jacket material 778 between core perimeter 806 and mold interior wall 1002. Additionally or alternatively, some embodiments include a combination of stand-off structures 720 having first end 722 coupled against mold interior wall 1002, as shown in FIG. 12, and stand-off structures 720 having first end 722 coupled against core perimeter 806, as shown in FIG. 22, to produce a more even distribution of jacket material 778 between core perimeter 806 and mold interior wall 1002. Additionally or alternatively, jacket outer wall 793 includes any other suitable structure, such as but not limited to a sine wave or square wave cross-section, that facilitates establishing offset distance 1004 and producing a preselected distribution of jacket material 778 between core perimeter 806 and mold interior wall 1002. Thus, it should be understood that the embodiments of FIG. 12 and FIG. 22 illustrate two options within a range of choices for the formation of component outer wall 94 having preselected thickness 104 and a selected distribution of jacket material 778 therein, and should not be viewed as limiting the configuration of jacket outer wall 793.

Furthermore, in some embodiments in which spacer material 1078 is used, as in the embodiment of FIG. 12, spacer material 1078 and/or filler material 1008 at least partially forms outer wall 94. Similarly, in some embodiments in which filler material 1009 is used, as in the embodiment of FIG. 22, filler material 1009 at least partially forms outer wall 94. For example, but not by way of limitation, spacer material 1078, filler material 1008, and/or filler material 1009 melts at a casting temperature of component 80, and molten component material 78 is added to molten spacer material 1078, molten filler material 1008, and/or molten filler material 1009 between core perimeter 806 and mold interior wall 1002 to form outer wall 94. In other embodiments, spacer material 1078, filler material 1008, and/or filler material 1009 is removed from mold assembly 1001 prior to addition of molten component material 78 between core perimeter 806 and mold interior wall 1002. In still other embodiments, spacer material 1078, filler material 1008, and/or filler material 1009 is removed from mold assembly 1001 as slag during or after addition of molten component material 78 between core perimeter 806 and mold interior wall 1002.

Moreover, as described above, core 800 is shaped to correspond to a shape of at least one internal void 100 of component 80, such that core 800 of jacketed core 980 positioned within mold cavity 1003 defines the at least one internal void 100 within component 80 when component 80 is formed. For example, in the exemplary embodiment, the at least one inner wall jacketed cavity 996 is configured to receive molten component material 78, such that the at least one plenum core portion 810, the at least one chamber core portion 812, and/or the inner wall aperture core portions 802 adjacent the at least one inner wall jacketed cavity 996 cooperate to define inner wall 96 of component 80. Jacket material 778 adjacent the at least one inner wall jacketed cavity 996 and component material 78, collectively bounded by the at least one plenum core portion 810, the at least one chamber core portion 812, and the inner wall aperture core portions 802, form inner wall 96. In some embodiments, for example, jacket material 778 of jacket inner walls 797 and 799 is substantially absorbed by molten component material 78 to form inner wall 96, while in other embodiments, for example, jacket inner walls 797 and 799 remain at least partially intact adjacent component material 78 within inner wall 96, as described above.

The at least one plenum core portion 810 defines the at least one plenum 110 interiorly of inner wall 96, the at least one chamber core portion 812 defines the at least one chamber 112 between inner wall 96 and outer wall 94, and the inner wall aperture core portions 802 define inner wall apertures 102 extending through inner wall 96. Moreover, in some embodiments, the at least one return channel core portion 814 defines the at least one return channel 114 at least partially defined by inner wall 96.

After component material 78 is cooled to form component 80, core 800 is removed from component 80 to form the at least one internal void 100. For example, but not by way of limitation, core material 878 is removed from component 80 using a chemical leaching process.

It should be recalled that, although component 80 in the exemplary embodiment is rotor blade 70, or alternatively stator vane 72, in alternative embodiments component 80 is any component suitably formable with an outer wall as described herein and for use in any application.

Mold 1000 is formed from a mold material 1006. In the exemplary embodiment, mold material 1006 is a refractory ceramic material selected to withstand a high temperature environment associated with the molten state of component material 78 used to form component 80. In alternative embodiments, mold material 1006 is any suitable material that enables component 80 to be formed as described herein.

Moreover, in the exemplary embodiment, mold 1000 is formed by a suitable investment process. For example, but not by way of limitation, jacketed core 980 is repeatedly dipped into a slurry of mold material 1006 which is allowed to harden to create a shell of mold material 1006, and the shell is fired to form mold 1000. Alternatively, jacketed cored precursor component 880 is repeatedly dipped into a slurry of mold material 1006 which is allowed to harden to create a shell of mold material 1006, and the shell is fired to form mold 1000 before, during, and/or after removal of precursor material 580. In alternative embodiments, mold 1000 is formed by any suitable method that enables mold 1000 to function as described herein.

In some embodiments in which spacer material 1078 is used on jacketed core 980, as in the embodiment of FIG. 12, as mold 1000 is formed around jacketed core 980, layer 1094 of spacer material 1078 adjacent jacket outer wall 793 facilitates shaping interior wall 1002 to correspond to the exterior shape of component 80. More specifically, layer 1094 is shaped to correspond to a shape of exterior surface 92 of component 80, such that layer 1094 is flush with first end 722 of each stand-off structure 720, as described above. Thus, mold material 1006 that couples against layer 1094 during the investment process also assumes a shape corresponding to exterior surface 92 of component 80.

Alternatively, in certain embodiments in which jacket outer wall 793 is spaced from core perimeter 806 at locations away from stand-off structures 720, as in the embodiment of FIG. 22, jacket outer wall 793 facilitates shaping interior wall 1002 to correspond to the exterior shape of component 80. More specifically, jacket outer wall 793 is shaped to correspond to a shape of exterior surface 92 of component 80 at locations away from stand-off structures 720, and filler material 1009 is added through second end 724 of each stand-off structure 720 to be flush with second end 724. Thus, mold material 1006 that couples against jacket outer wall 793 and filler material 1009 during the investment process also assumes a shape corresponding to exterior surface 92 of component 80.

In alternative embodiments, mold 1000 is formed and/or interior wall 1002 is shaped in any suitable fashion that enables mold assembly 1001 to function as described herein.

In certain embodiments, after stand-off structures 720 are coupled against interior wall 1002, jacketed core 980 is secured relative to mold 1000 such that core 800 remains fixed relative to mold 1000 during a process of forming component 80. For example, jacketed core 980 is secured such that a position of core 800 does not shift during introduction of molten component material 78 into mold 1000. In some embodiments, external fixturing (not shown) is used to secure jacketed core 980 relative to mold 1000. Additionally or alternatively, jacketed core 980 is secured relative to mold 1000 in any other suitable fashion that enables the position of core 800 relative to mold 1000 to remain fixed during a process of forming component 80.

In some embodiments, the use of jacketed core 980, including the at least one stand-off structure 720 to position perimeter 806 of core 800 at offset distance 1004 from interior wall 1002, as compared to other methods such as, but not limited to, a use of platinum locating pins, enables an improved precision and/or repeatability in forming of outer wall 94 of component 80 having a selected outer wall thickness 104. In particular, but not by way of limitation, in some such embodiments the use of jacketed core 980 including the at least one stand-off structure 720 enables repeatable and precise formation of outer wall 94 thinner than is achievable by other known methods.

An exemplary method 1400 of forming a component, such as component 80, having an outer wall of a predetermined thickness, such as outer wall 94 having predetermined thickness 104, is illustrated in a flow diagram in FIGS. 14-17. With reference also to FIGS. 1-13 and 18-22, exemplary method 1400 includes introducing 1442 a component material, such as component material 78, in a molten state into a mold assembly, such as mold assembly 1001. The mold assembly includes a jacketed core, such as jacketed core 980, positioned with respect to a mold, such as mold 1000. The mold includes an interior wall, such as interior wall 1002, that defines a mold cavity within the mold, such as mold cavity 1003. The jacketed core includes a jacket, such as jacket 700, that includes an outer wall, such as jacket outer wall 793. The jacketed core also includes a core, such as core 800, positioned interiorly of the jacket outer wall. The jacket separates the core perimeter from the mold interior wall by the predetermined thickness.

Method 1400 also includes cooling 1446 the component material to form the component. The perimeter and the interior wall cooperate to define the outer wall of the component therebetween.

In certain embodiments, method 1400 also includes coupling 1428 a layer of a spacer material, such as layer 1094 of spacer material 1078, adjacent the jacket outer wall. The layer is shaped to correspond to a shape of an exterior surface, such as exterior surface 92, of the component. In some such embodiments, the jacket outer wall includes at least one stand-off structure, such as stand-off structure 720, and method 1400 further includes forming the layer by positioning 1430 the jacketed core with respect to a pattern die such that a first end of each stand-off structure, such as first end 722, is coupled against an interior wall of the pattern die, and injecting 1432 the spacer material into the pattern die. The interior wall of the pattern die has a shape complementary to a shape of an exterior surface of the component. Additionally or alternatively, in some such embodiments, method 1400 further includes forming 1434 the layer using an additive manufacturing process prior to coupling 1428 the layer adjacent the jacket outer wall. Additionally or alternatively, in some such embodiments, method 1400 further includes forming 1436 the layer as a pre-sintered metallic structure.

Moreover, in some such embodiments, method 1400 further includes removing 1440 the spacer material from the mold assembly prior to introducing 1442 the component material in the molten state. In some such embodiments, removing 1440 the spacer material from the mold assembly further includes burning out 1444 the spacer material. Additionally or alternatively, in some such embodiments, cooling 1446 the component material to form the component further comprises cooling 1448 the component material such that at least the component material and the spacer material cooperate to the form the outer wall of the component.

In some embodiments, the jacket is formed from a jacket material, such as jacket material 778, and cooling 1446 the component material to form the component further comprises cooling 1450 the component material such that at least the component material and the jacket material cooperate to the form the outer wall of the component.

In certain embodiments, method 1400 also includes forming 1412 the jacket around a precursor component, such as precursor component 580, shaped to correspond to a shape of at least portions of the component. In some such embodiments, an outer wall of the precursor component, such as outer wall 594, includes an exterior surface, such as exterior surface 592, an opposite second surface, such as second surface 593, and at least one outer wall indentation defined in the second surface, such as indentation 520, and forming 1412 the jacket further includes forming 1414 at least one stand-off structure, such as stand-off structure 720, in the at least one outer wall indentation. Additionally or alternatively, the step of forming 1412 the jacket further includes depositing 1416 the jacket material on the precursor component in a plating process, as described above. Additionally or alternatively, in some such embodiments, method 1400 further includes forming 1402 the precursor component at least partially using an additive manufacturing process.

Additionally or alternatively, method 1400 further includes separately forming 1404 a plurality of precursor component sections, such as precursor component sections 1280, and coupling 1410 the plurality of sections together to form the precursor component. In some such embodiments, the step of forming 1412 the jacket includes forming 1408 the jacket on each of the sections prior to the step of coupling 1410 the sections together, and method 1400 also includes masking 1406 at least one mating surface, such as mating surface 1202, of the plurality of sections prior to the step of forming 1408 the jacket, such that deposition of the jacket material on the at least one mating surface is inhibited.

In certain embodiments, method 1400 further includes adding 1424 the core to the jacketed precursor component to form a jacketed cored precursor component, such as jacketed cored precursor component 880, and removing 1426 the precursor component from the jacketed cored precursor component to form the jacketed core.

In some embodiments, method 1400 further includes forming 1418 the jacket using an additive manufacturing process. Additionally or alternatively, method 1400 further includes separately forming 1420 a plurality of jacket sections, and coupling 1422 the plurality of jacket sections around the core to form the jacketed core.

In some embodiments, method 1400 also includes forming 1438 the mold around the jacketed core by an investment process, as described above.

The above-described embodiments of mold assemblies and methods enable making of components having an outer wall of a predetermined thickness with improved precision and repeatability as compared to at least some known mold assemblies and methods. Specifically, the mold assembly includes a jacketed core that includes a core positioned interiorly of a jacket outer wall, such that the jacket separates a perimeter of the core from an interior wall of the mold by the predetermined thickness. The core perimeter and mold interior wall cooperate to define the outer wall of the component therebetween. Also specifically, the jacket protects the core from damage and facilitates preserving the selected cavity space dimensions between the core perimeter and the mold interior wall, for example by inhibiting the core and mold from shifting, shrinking, and/or twisting with respect to each other during firing of the mold. Also specifically, the jacketed core automatically provides the preselected outer wall thickness without use of locating pins, thus reducing a time and cost of preparing the mold assembly for prototyping or production operations. In some cases, the above-described embodiments enable formation of components having relatively thin outer walls that cannot be precisely and/or repeatably formed using other known mold assemblies and methods.

An exemplary technical effect of the methods, systems, and apparatus described herein includes at least one of: (a) reducing or eliminating fragility problems associated with forming, handling, transport, and/or storage of a core used in forming a component having a preselected outer wall thickness; (b) improving precision and repeatability of formation of components having an outer wall of a predetermined thickness, particularly, but not limited to, components having relatively thin outer walls; and (c) enabling casting of components having an outer wall of a predetermined thickness without use of locating pins.

Exemplary embodiments of mold assemblies and methods including jacketed cores are described above in detail. The jacketed cores, and methods and systems using such jacketed cores, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use cores within mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component having an outer wall of a predetermined thickness, said method comprising:
    introducing a component material in a molten state into a mold assembly, the mold assembly including a jacketed core positioned with respect to a mold, wherein the mold includes an interior wall that defines a mold cavity within the mold, and the jacketed core includes:
    a jacket that includes an outer wall; and
    a core positioned interiorly of the jacket outer wall, wherein the jacket separates the core having a perimeter from the mold interior wall by the predetermined thickness; and
    cooling the component material to form the component, wherein the perimeter and the interior wall cooperate to define the outer wall of the component therebetween, wherein said jacket outer wall comprises at least one stand-off structure that extends from a first end to a second end, wherein one of said first and second ends is coupled against said core perimeter and another of said first and second ends is coupled against said mold interior wall.

2. The method of claim 1, further comprising coupling a layer of a spacer material adjacent the jacket outer wall, the layer shaped to correspond to a shape of the component outer wall.

3. The method of claim 2, wherein the jacket outer wall includes at least one stand-off structure, said method further comprising forming the layer of spacer material by:
    positioning the jacketed core with respect to a pattern die such that a first end of the at least one stand-off structure is coupled against an interior wall of the pattern die, wherein the interior wall of the pattern die has a shape complementary to the shape of an exterior surface of the component; and
    injecting the spacer material into the pattern die.

4. The method of claim 2, further comprising forming the layer of spacer material using an additive manufacturing process prior to coupling the layer adjacent the jacket outer wall.

5. The method of claim 2, further comprising forming the layer of spacer material as a pre-sintered metallic structure.

6. The method of claim 2, further comprising removing the spacer material from the mold assembly prior to introducing the component material in the molten state.

7. The method of claim 6, wherein removing the spacer material from the mold assembly comprises burning out the spacer material.

8. The method of claim 2, wherein cooling the component material to form the component further comprises cooling the component material such that at least the component material and the spacer material cooperate to form the outer wall of the component.

9. The method of claim 1, wherein the jacket is formed from a jacket material, and wherein cooling the component material to form the component further comprises cooling the component material such that at least the component material and the jacket material cooperate to form the outer wall of the component.

10. The method of claim 1, further comprising forming the jacket around a precursor component, wherein the precursor component is shaped to correspond to a shape of at least portions of the component.

11. The method of claim 10, wherein an outer wall of the precursor component includes an exterior surface, an opposite second surface, and at least one outer wall indentation defined in the second surface, and forming the jacket further comprises forming at least one stand-off structure of the jacket outer wall in the at least one outer wall indentation.

12. The method of claim 10, wherein forming the jacket comprises depositing a jacket material on the precursor component in a plating process.

13. The method of claim 10, further comprising forming the precursor component at least partially using an additive manufacturing process.

14. The method of claim 10, further comprising:
separately forming a plurality of precursor component sections; and
coupling the plurality of precursor component sections together to form the precursor component.

15. The method of claim 14, wherein forming the jacket comprises forming the jacket on each of the precursor component sections prior to coupling the sections together, said method further comprising masking at least one mating surface of the plurality of precursor component sections prior to forming the jacket, such that formation of the jacket on the at least one mating surface is inhibited.

16. The method of claim 10, further comprising:
adding the core to the jacketed precursor component to form a jacketed cored precursor component; and
removing the precursor component from the jacketed cored precursor component to form the jacketed core.

17. The method of claim 1, further comprising forming the jacket using an additive manufacturing process.

18. The method of claim 17, wherein forming the jacket comprises:
separately forming a plurality of jacket sections; and
coupling the plurality of jacket sections around the core to form the jacketed core.

19. The method of claim 1, further comprising forming the mold around the jacketed core by an investment process.

20. The method of claim 1, wherein a thickness of said at least one stand-off structure corresponds to the predetermined thickness.

21. The method of claim 1, wherein the method further comprises a layer of a spacer material adjacent said jacket outer wall, said layer shaped to correspond to a shape of the component outer wall.

22. The method of claim 21, wherein the component material is an alloy, and said spacer material comprises at least one constituent material of the alloy.

23. The method of claim 21, wherein said layer is formed from a plurality of separate sections coupled to said jacketed core.

24. The method of claim 1, wherein said jacketed core further comprises a filler material positioned within said at least one stand-off structure adjacent one of said core perimeter and said mold interior wall.

25. The method of claim 1, wherein said jacket further comprises opposing jacket inner walls positioned interiorly from said second jacket outer wall, said opposing jacket inner walls define at least one inner wall jacketed cavity therebetween, said at least one inner wall jacketed cavity configured to receive the component material in the molten state and form an inner wall of the component therein.

26. The method of claim 25, wherein said core comprises at least one chamber core portion positioned between a first of said jacket inner walls and said jacket outer wall.

27. The method of claim 26, wherein said core comprises at least one return channel core portion configured to define at least one fluid return channel within the component, the at least one fluid return channel in flow communication with a chamber of the component defined by said at least one chamber core portion.

28. The method of claim 1, wherein the component material is an alloy, and said jacket is formed from a jacket material that comprises at least one constituent material of the alloy.

* * * * *